(12) United States Patent
Saikyo et al.

(10) Patent No.: US 7,190,978 B2
(45) Date of Patent: Mar. 13, 2007

(54) MOBILE NETWORK SIMULATOR APPARATUS

(75) Inventors: Isao Saikyo, Atsugi (JP); Takashi Sato, Hatogaya (JP)

(73) Assignee: Anritsu Corporation, Tokyo (JP)

( * ) Notice: Subject to any disclaimer, the term of this patent is extended or adjusted under 35 U.S.C. 154(b) by 93 days.

(21) Appl. No.: 11/147,051

(22) Filed: Jun. 7, 2005

(65) Prior Publication Data

US 2006/0003810 A1    Jan. 5, 2006

(30) Foreign Application Priority Data

Jul. 2, 2004 (JP) .............................. 2004-196823
Sep. 29, 2004 (JP) .............................. 2004-284239

(51) Int. Cl.
*H04Q 7/20* (2006.01)

(52) U.S. Cl. ...................................... 455/566; 455/423

(58) Field of Classification Search ................ 455/466, 455/423, 424, 9, 67.11–67.12, 67.16
See application file for complete search history.

(56) References Cited

U.S. PATENT DOCUMENTS

| | | | | |
|---|---|---|---|---|
| 5,627,834 | A | * | 5/1997 | Han et al. ................... 370/241 |
| 5,640,448 | A | * | 6/1997 | Toyoshima ................. 379/165 |
| 6,735,298 | B2 | * | 5/2004 | Neyman et al. .......... 379/265.1 |
| 2002/0176394 | A1 | | 11/2002 | Bryger et al. |
| 2002/0183054 | A1 | | 12/2002 | Rimoni et al. |
| 2002/0194587 | A1 | * | 12/2002 | Lampton et al. .............. 725/10 |
| 2005/0220044 | A1 | * | 10/2005 | Choi et al. ................... 370/310 |
| 2006/0223637 | A1 | * | 10/2006 | Rosenberg ................... 463/47 |

FOREIGN PATENT DOCUMENTS

JP    10-307154 A    11/1998
WO   WO 02/084907 A1   10/2002

(Continued)

OTHER PUBLICATIONS

MD8470A Signaling Tester, 'Online! Apr. 30, 2005, pp. 1-12, XP002354122 Retrieved from the Internet: URL:http://www.anritsu.de/files/MD8470A_E1200.PDF> 'retrieved on Nov. 14, 2005! pp. 2, 3, 5-7, 11.

(Continued)

*Primary Examiner*—CongVan Tran
(74) *Attorney, Agent, or Firm*—Frishauf, Holtz, Goodman & Chick, P.C.

(57) ABSTRACT

A mobile network simulator section has a function as least one mobile network simulator which forms a communication line between a test terminal and a connection destination in response to a connection request and which disconnects the communication line in response to a disconnection request. A sequence state display control section displays on a sequence display section of a display device any one of sequences indicating communication procedures and communication transition states between at least the test terminal and the mobile network simulator section with respect to a series of communication tests between the test terminal and the connection destination connected via the communication line. A connection state display control section associates the connection state between the test terminal and the connection destination via the mobile network simulator section with the communication transition state, and displays on a connection state display section of the display device the associated connection state to be linked with a display of the sequences by the sequence state display control section.

18 Claims, 28 Drawing Sheets

FOREIGN PATENT DOCUMENTS

WO      WP 03/077080 A2     9/2003

OTHER PUBLICATIONS

MD1620B Signaling Tester, 'Online? Aug. 31, 2000, pp. 1-10, XP002354123 Retrieved from the Internet: URL:http://www.anritsu.co.jp/Products/pdf_e/MD1620B_EA3300.PDF> 'retrieved on Nov. 14, 2005! pp. 2-6.

"GPRS Software" K1297-G20 Series Protocol Tester, 'Online! May 31, 2004, pp. 1-8, XP002354124, Retrieved From the Internet: url:http//www.tek.com/site/ps/2F-155362/pdfs/2FW_15362.pdf> 'retrieved on 2005-11-141, pp. 1, 2.

Anritsu; Electronic Measuring Instruments; 1998; Radio Communications Test Instruments; pp. 9-11, 251-253 (MD1620C Signaling Tester) No. 98.

* cited by examiner

[During startup]

[When power is supplied]

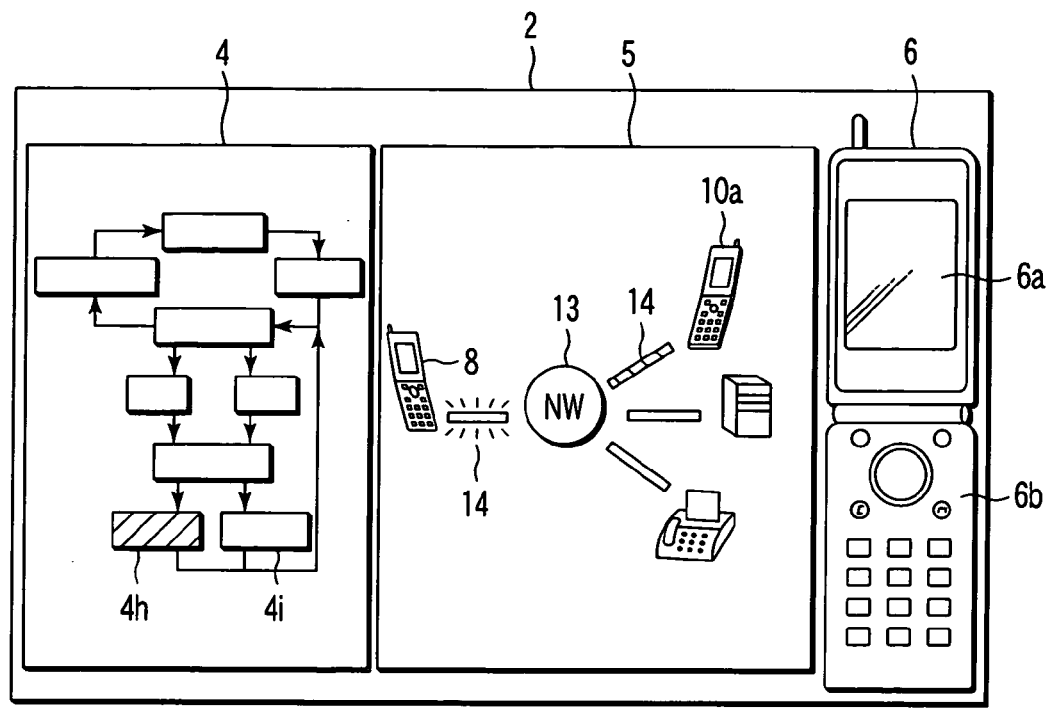
F I G. 10
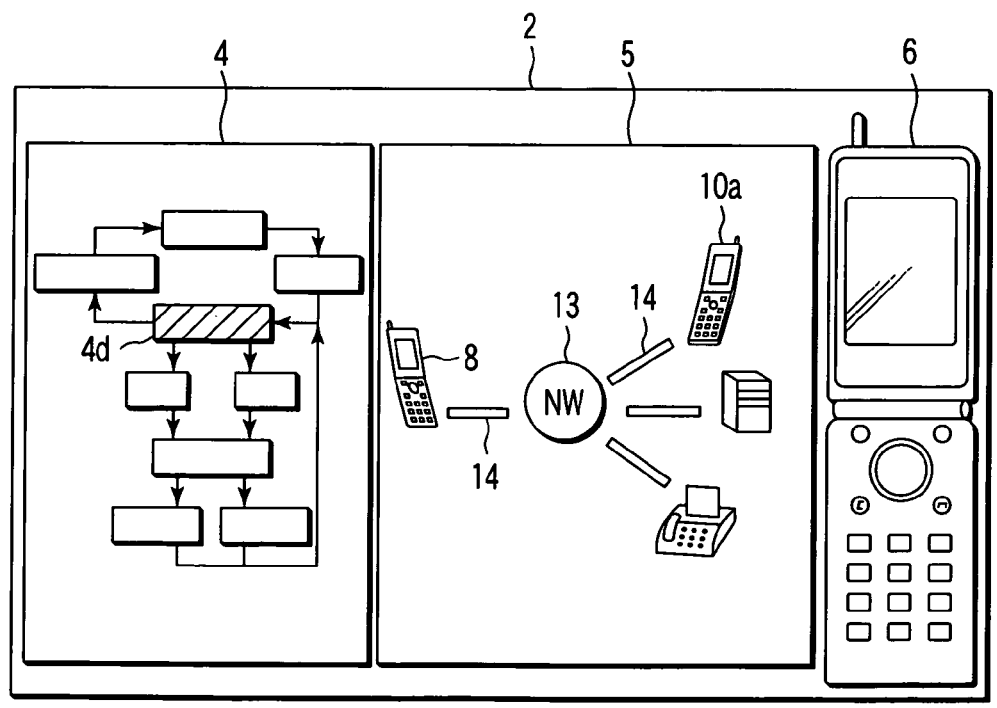
F I G. 11

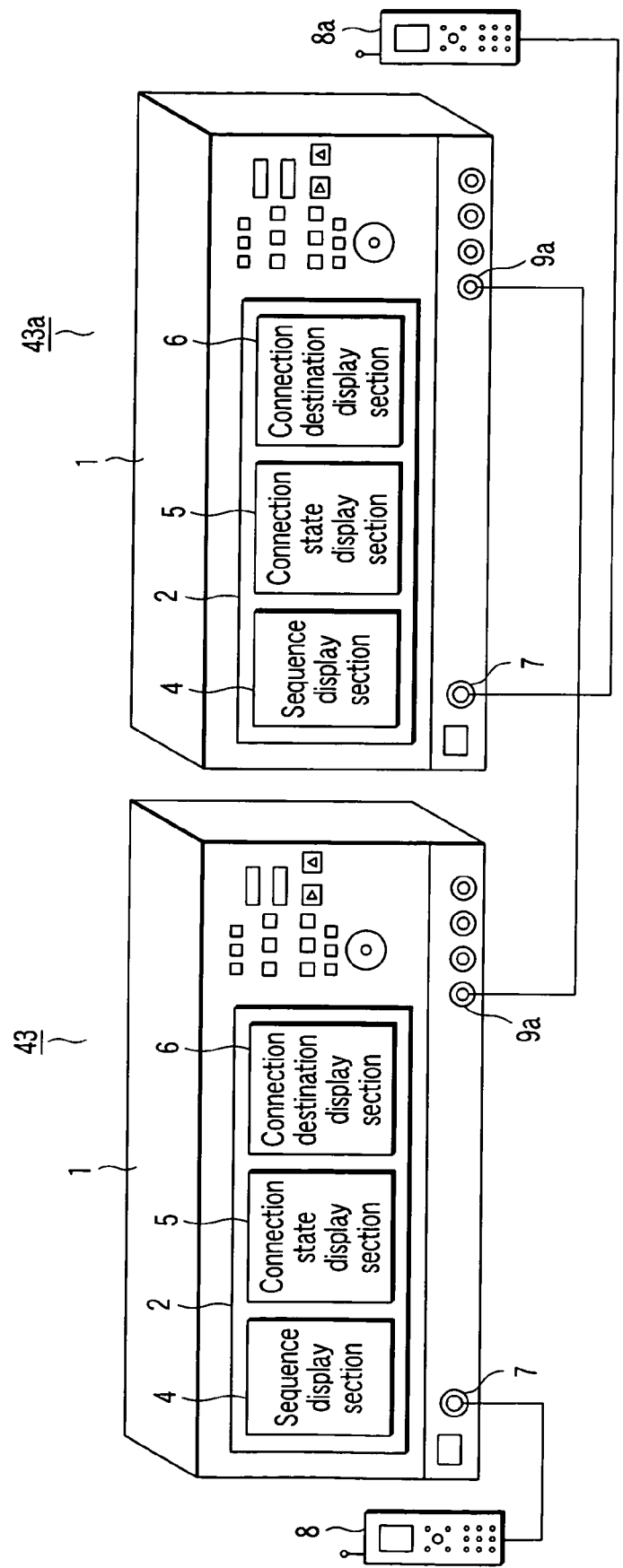
F I G. 16

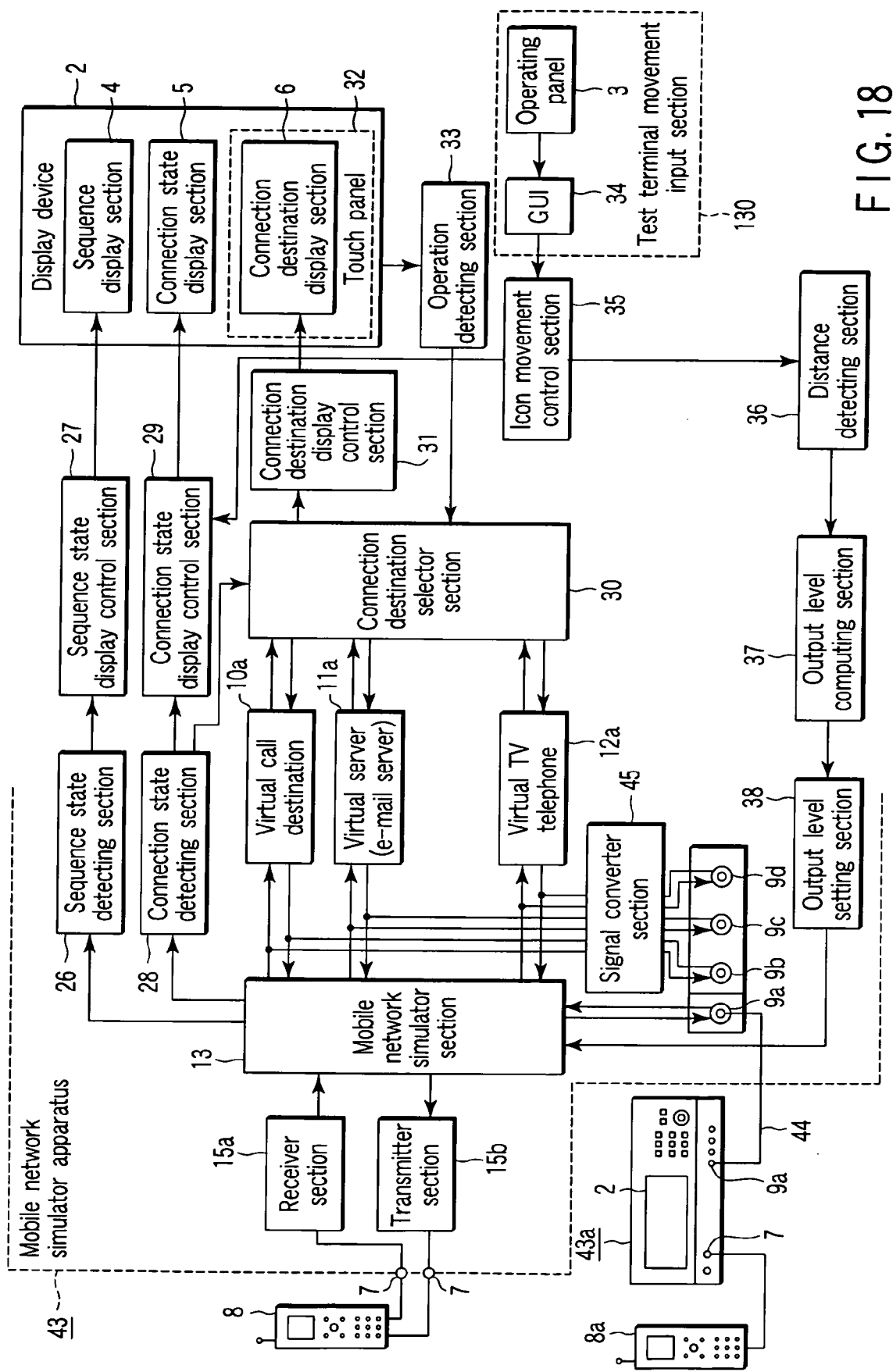
F I G. 18

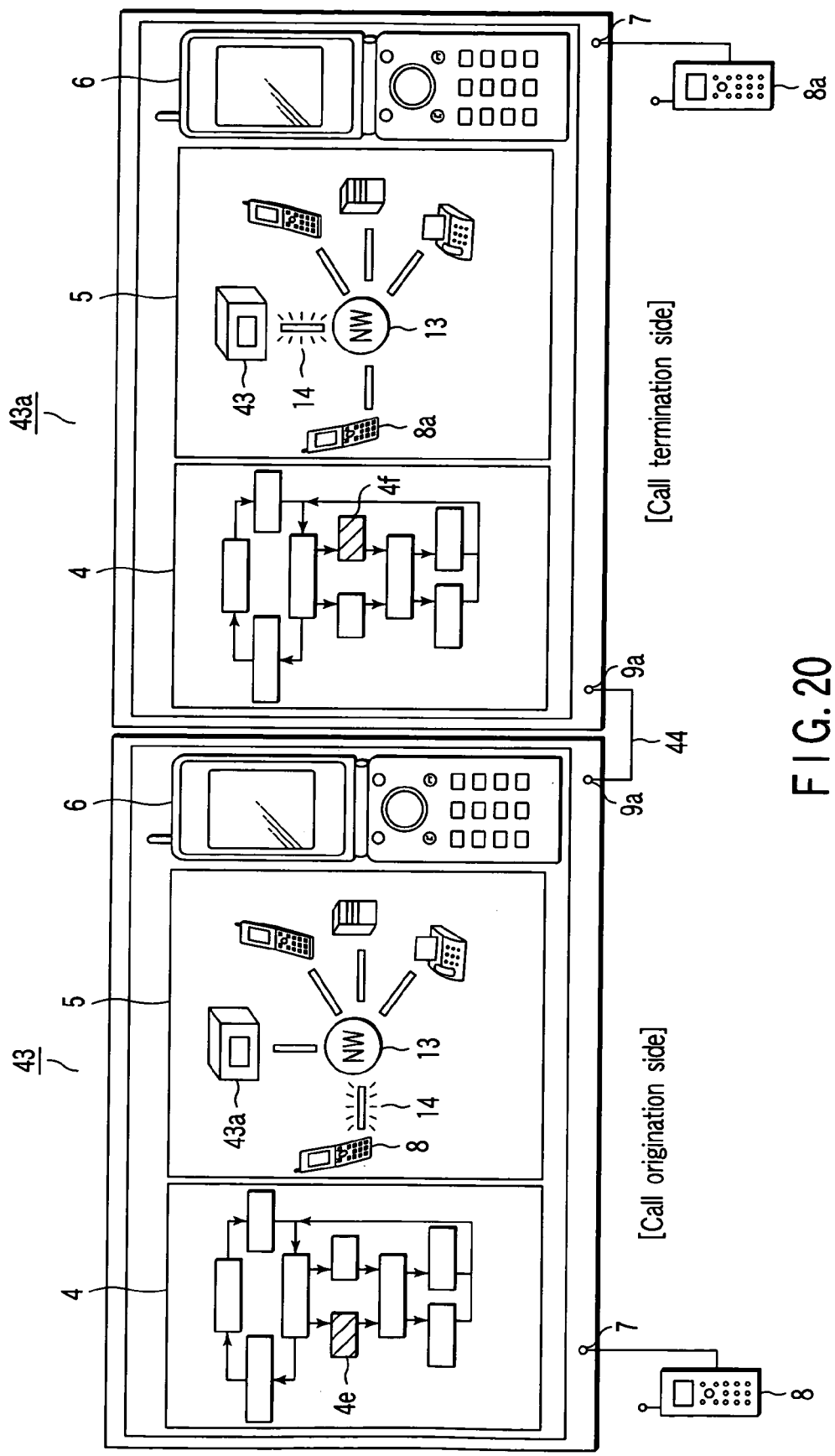
F I G. 20

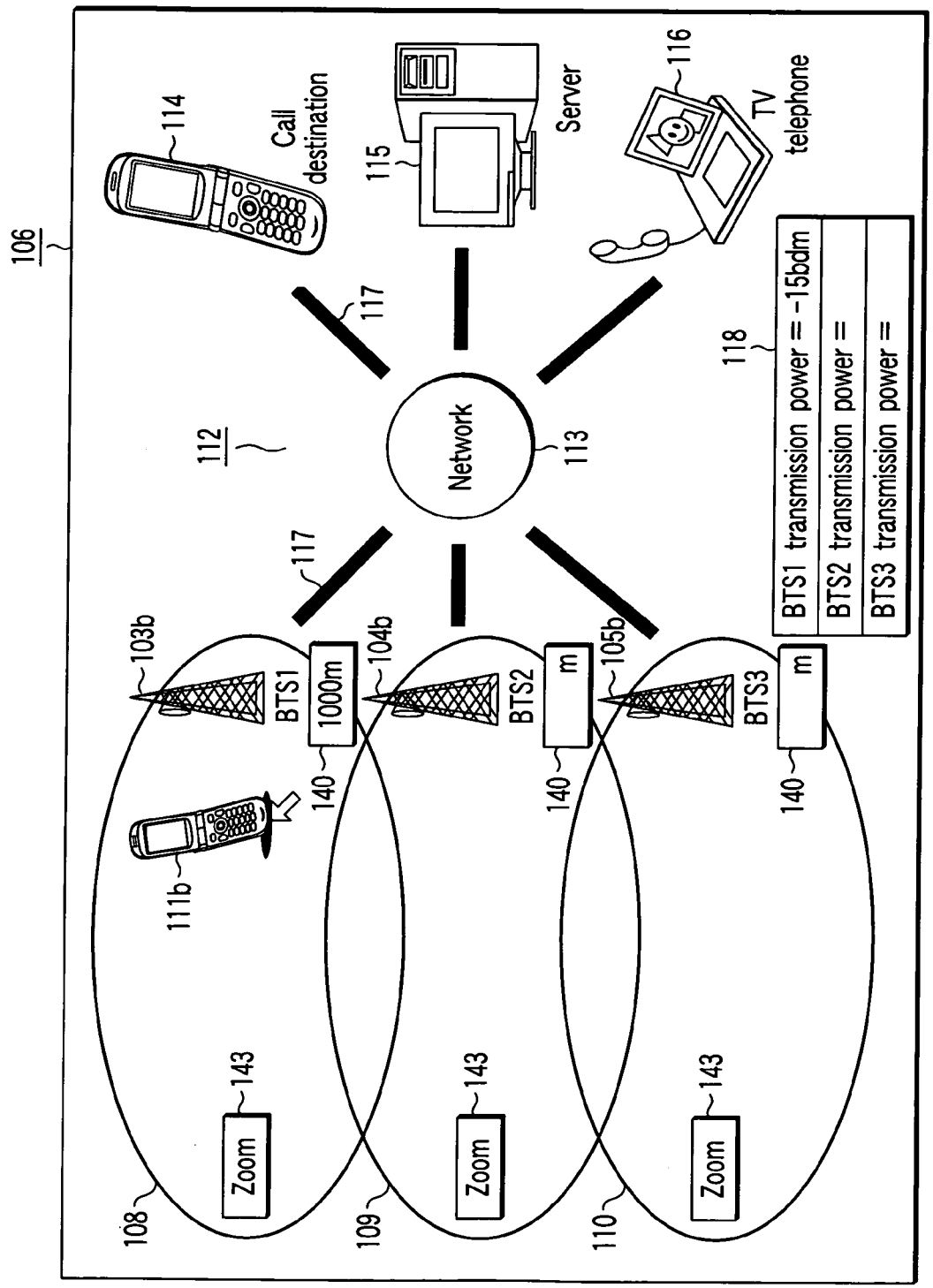
F I G. 24

Direct specification of position by mouse or the like

Direct specification of position by touch panel

Specification of position by transmission power input

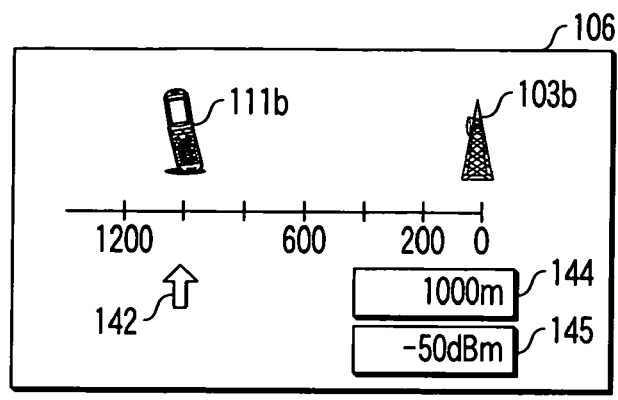
FIG. 27D  Specification of position by another screen
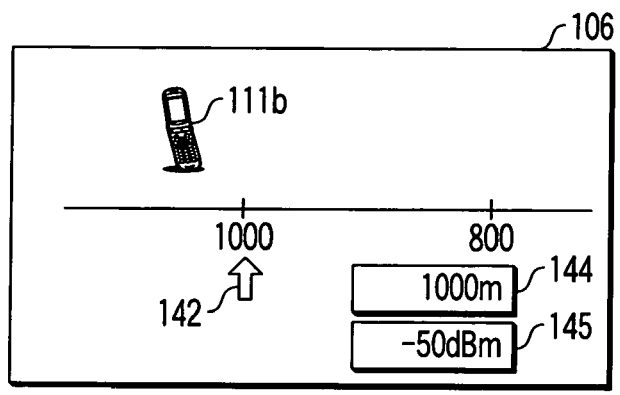
FIG. 27E  Specification of position by zoom screen
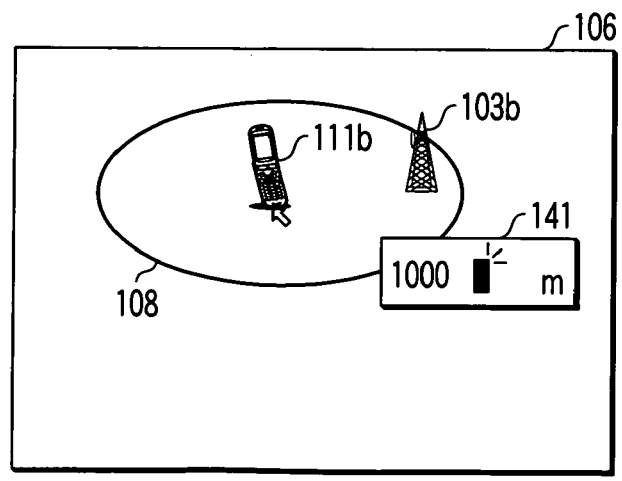
FIG. 27F  Specification of position by distance input

MOBILE NETWORK SIMULATOR APPARATUS

CROSS-REFERENCE TO RELATED APPLICATIONS

This application is based upon and claims the benefit of priority from prior Japanese Patent Applications No. 2004-196823, filed Jul. 2, 2004; and No. 2004-284293, filed Sep. 29, 2004, the entire contents of both of which are incorporated herein by reference.

BACKGROUND OF THE INVENTION

1. Field of the Invention

The present invention relates to a mobile network simulator apparatus, and more particularly, to a mobile network simulator apparatus for checking and testing a communicating operation with a connection destination in a test terminal composed of, for example, a mobile communication terminal.

2. Description of the Related Art

For example, when a mobile communication terminal such as a mobile cellular phone or a personal handy phone (PHS) is newly developed, there is a need for a communication test for checking that the mobile communication terminal can make a communicating operation normally with a connection destination (communication destination).

In the case where such a communication test is executed, a mobile communication terminal to be tested (hereinafter, referred to as test terminal) cannot be connected to a connection destination (communication destination) via an actual base station. Thus, the communicating operation with the connection destination of the test terminal is checked by using a mobile network simulator apparatus having a function similar to the actual base station.

In non-patent document 1 "Anritsu, ELECTRONIC MEASURING INSTRUMENTS, 1998, 6: Radio Communications Test Instruments pp 9–11, 251–253, (MD1620C Signaling Tester) No. '98 GENERAL-E-A-1-(1.00) Printed in USA 1997-11 500QP", there is disclosed: a mobile network simulator apparatus having a technique of, when such a communication test is executed, sequences indicating procedures and states relating to a test terminal and a connection destination (communication destination) or a measuring instrument having a normal function are detected every time the test is executed, and displaying the sequences on a display device.

In this mobile network simulator apparatus disclosed in non-patent document 1, while a communication line is formed between the test terminal and the connection destination (communication destination) or the measuring instrument, the communication line is formed during communication procedures and communication transition state exchanged with the test terminal between the test terminal and the connection destination (communication destination) or measuring instrument; the communication line is disconnected, and an original state is established. During this period, the communication procedures and communication transition state exchanged between the test terminal and the connection destination (communication destination) or measuring instrument and the mobile network simulator are detected every time, and the relevant sequence is displayed on the display device.

In this manner, personnel who executes testing can visually grasp during which communication procedures and communication transition state the test terminal is established from among a series of communication tests.

Therefore, personnel who executes testing can locate the cause of a failure if the failure occurs in a short time in the communication tests of the test terminal.

However, the mobile network simulator apparatus disclosed in the non-patent document 1 described above still has the following problems which remain unsolved.

In recent years, a mobile communication terminal having a variety of functions has been used as a test terminal. The connection destinations which can be connected to the test terminal include: a general communication telephone terminal; a communication server for transmitting and receiving E-mail or information communication; and a TV telephone (Video call terminal).

Concurrently, a variety of services are provided from a connection destination through a mobile communication terminal which serves as a test terminal. Thus, there is a need for a mobile network simulator apparatus capable of efficiently carrying out a communication test for providing such a variety of services.

In such a mobile network simulator apparatus which executes a communication test, first, a test terminal is connected to the mobile network simulator, and then, connected to a specified connection destination. In this connected state, a test of services provided from the connection destination is carried out, and lastly, the test terminal is disconnected from the connection destination.

In the mobile network simulator apparatus using the technique disclosed in the non-patent document 1 described above, personnel who develops services provided through the test terminal and personnel who executes testing are required to grasp a connection state between the test terminal and the connection destination by analyzing contents of a sequence displayed on the display device.

However, for the personnel who develops services provided through the test terminal and personnel who executes testing, the personnel being unfamiliar with use of the mobile network simulator apparatus, it is difficult to externally grasp the connection state between the test terminal and the connection destination by analyzing the contents of the sequence displayed on the display device. Thus, there is a problem that their workability is likely to be lowered.

In the meantime, one of the characteristics possessed by a mobile communication terminal serving as a test terminal includes reception characteristics (such as receiving sensitivity) when a signal (radio wave) transmitted from a base station is received.

A general technique for measuring the receiving sensitivity of the mobile terminal includes: receiving a signal of a defined signal level outputted from the base station at the mobile terminal; and measuring a reception level of the received signal at the mobile terminal side.

Then, a distance of the mobile terminal from the base station is increased, and a reception level of the received signal at a time point at which the reception level of the received signal at the mobile terminal side has been lowered to an allowable value (limit value) or less is defined as a minimum receiving level of the mobile terminal.

In addition, an example in the case where the receiving sensitivity of the test terminal is measured by using the mobile network simulator apparatus as described above includes: transmitting a test signal which includes predetermined digital data from the mobile network simulator apparatus to the test terminal without changing the distance between the test terminal and the mobile network simulator apparatus (or while making connection via a cable) so as to measure an error bit rate (EBR) of digital data included in the test signal received at the test terminal side.

Then, after measuring a change of the error bit rate (EBR) of the received signal of the test terminal in the case where transmission powers (output levels) of a transmission signal to be transmitted from the mobile network simulator apparatus to the test terminal are sequentially lowered, the transmission power (output level) of the transmission signal at a time point at which the error bit rate (EBR) has exceeded an allowable value (limit value) is defined as a minimum receiving level of the test terminal.

Further, it is also possible to use a technique of sequentially lowering the transmission powers (output levels) of a general communication signal transmitted from the mobile simulator apparatus to the test terminal, and concurrently, checking whether or not a normal response signal is returned from the test terminal to the mobile network simulator apparatus side.

Therefore, in such a mobile network simulator apparatus having a function for carrying out testing of the receiving function (sensitivity) of the test terminal, it is necessary for personnel who executes testing to input the transmission power (output level) of the transmission signal to the test terminal.

In a "display device with a mouse data input function" disclosed in patent document 1 (Jpn. Pat. Appln. KOKAI Publication No. 10-307154), physical switches conventionally provided in equipment are displayed on a display screen of a display device, and a knob in illustration of the displayed switches is moved by a mouse, thereby achieving software switch input.

As described previously, it is essentially necessary to carry out testing of the receiving function (sensitivity) of the test terminal while changing a distance from the base station of the mobile terminal.

Therefore, it is necessary for the personnel who executes testing to input the output level of the transmission signal from the mobile network simulator apparatus to the test terminal while checking a positional relationship between the test terminal and the base station every time by using an input device such as a keyboard. Thus, a testing operation is very complicated.

In actuality, since a plurality of base stations are existed, each base station has a communication area which enables communication with the mobile terminal, thus making it necessary to achieve (simulate) a communication state between the test terminal and each base station in the case where the test terminal is positioned at a portion superimposed with a communication area of another base station which is adjacent to a communication area of a base station in which the test terminal exists as well as a communication state between the test terminal and a base station, the test terminal being positioned in a communication area of the base station.

Therefore, a testing operation by the personnel who executes testing becomes more complicated in order to test more complicated receiving function in the test terminal by using the mobile network simulator apparatus. Thus, there is a problem that their workability is likely to be lowered.

BRIEF SUMMARY OF THE INVENTION

It is an object of the present invention to provide a mobile network simulator apparatus capable of significantly improving workability of personnel who executes testing or the like in view of the above-described circumstance.

In order to achieve the above object, according to a first aspect of the present invention, there is provided a mobile network simulator apparatus comprising:

a mobile network simulator section (13) interposed between a test terminal (8) to be tested and at least one connection destination (10, 11, 12) configured to be connected to the test terminal, the mobile network simulator section having a function as at least one mobile network simulator which forms a connection line between the test terminal and the connection destination in response to a connection request from any one of the test terminal and the connection destination to the other and which disconnects the communication line in response to a disconnection request from the any one or the other;

a sequence state display control section (27) which, with respect to a series of communication tests between the test terminal and the connection destination connected via the communication line formed by the mobile network simulator section, displays on a sequence display section (4) of a display device (2) at least one of sequences (4a to 4i) indicating communication procedures and communication transition states between the test terminal and the mobile network simulator section and between the connection destination and the mobile network simulator section; and a connection state display control section (29) which associates the connection state between the test terminal and the connection destination via the mobile network simulator section with the communication transition state to be linked with a sequence display by the sequence state display control section and to be displayed on a connection state display section (5) of the display device.

In the thus configured mobile network simulator apparatus, a sequence with a mobile network simulator section is displayed with respect to a series of communication tests between a test terminal and a connection destination. In addition to display of this sequence, a connection state between the test terminal and the connection destination is displayed to be linked with sequence display while it is associated with a communication transition state.

In order to achieve the above object, according to a second aspect of the present invention, there is provided a mobile network simulator apparatus according to the first aspect, wherein the at least one of the connection destinations displayed on the connection state display section of the display device by the connection state display control section is a virtual connection destination (10a, 11a, 12a) which simulates an actual connection destination.

In the thus configured mobile network simulator apparatus, the mobile network simulator apparatus incorporates at least one of the connection destinations which can be connected to the test terminal as at least one virtual connection destination which simulates an actual connection destination. Thus, it is not necessary to additionally prepare an actual connection destination which can be connected to the test terminal and to connect the destination to the mobile network simulator apparatus.

As a result, a communication test with the virtual connection destination relevant to the test terminal can be carried out by the mobile network simulator apparatus solely.

In order to achieve the above object, according to a third aspect of the present invention, there is provided a mobile network simulator apparatus according to the first aspect, further comprising:

test terminal moving means (34, 130) including a graphical user interface (GUI) which changes a distance (D) on the display screen to the mobile network simulator section from the test terminal displayed on the connection state display section of the display device by the connection state display control section by moving the test terminal through an external operation; and output level setting means (38) for changing a level of a transmission signal from the mobile network simulator section to the test terminal according to the distance from the test terminal moved on the display screen to the mobile network simulator section.

In order to achieve the above object, according to a fourth aspect of the present invention, there is provided a mobile network simulator apparatus according to the third aspect, wherein, when the distance on the display screen is longer than a predetermined distance, the output level setting means decreases the level of the transmission signal relevant to the test terminal from the mobile network simulator depending on the distance, and, when the distance on the display screen is shorter than the predetermined distance, the output level setting means increases the level of the transmission signal from the mobile network simulator section depending on the distance.

In the thus configured mobile network simulator apparatus, the personnel who executes testing changes the distance on the display screen between the test terminal and the mobile network simulator section by using the GUI technique, thereby making it possible to change a level of the transmission signal from the mobile network simulator section to the test terminal. In addition, a relationship between ac actual test terminal and the base station can be simulated, thus making it possible to carry out more types tests relevant to the test terminal.

In order to achieve the above object, according to a fifth aspect of the present invention, there is provided a mobile network simulator apparatus according to the first aspect, further comprising:

a mail application (41a) which, when at least one of the connectable connection destinations is an E-mail server (11a), carries out transmission and reception of an E-mail to and from the E-mail server; and editing means (31, 32, 33) for displaying the E-mail transmitted and received by the mail application on a mail screen display section (41) of the display device, and enabling editing by an external operation.

In the thus configured mobile network simulator apparatus, the function of E-mail that the test terminal has can be checked (tested) by executing E-mail exchange with the mail application provided in the mobile network simulator apparatus, and by use of creation, browse, editing, and operation of E-mail.

In order to achieve the above object, according to a sixth aspect of the present invention, there is provided a mobile network simulator apparatus according to the first aspect, wherein the at least one of the connectable connection destinations is another mobile network simulator apparatus (43a).

In the thus configured mobile network simulator apparatus, two or more mobile network simulator apparatuses are connected to each other; a test terminal is connected to each of the mobile network simulator apparatuses; and a test terminal connected to a remote mobile network simulator apparatus from the test terminal of one mobile network simulator apparatus is designated. In this manner, a comparative test can be carried out by using both of the test terminals.

In order to achieve the above object, according to a seventh aspect of the present invention, there is provided a mobile network simulator apparatus according to the first aspect, wherein, as the sequence displayed on the sequence display section of the display device by the sequence state display control section, at least one of the sequence indicating the communication procedure and communication transition state between the test terminal and the mobile network simulator section and the sequence indicating the communication procedure and communication transition state between the connection destination and the mobile network simulator section can be selected with respect to a communication test between the test terminal and the connection destination connected via the mobile network simulator section.

In the thus configured mobile network simulator apparatus, it is possible for the personnel who executes testing to cause the sequence display section of the display device to selectively display a desired connection portion to the mobile network simulator section in the contents of the sequence as required.

In order to achieve the above object, according to an eighth aspect of the present invention, there is provided a mobile network simulator apparatus according to the third aspect, wherein the test terminal and the network simulator section are displayed on a quadrature coordinate formed on the display screen in the connection state display section of the display device, and the distance on the display screen is obtained in only a coordinate defined by one of the quadrature coordinates indicating positions of the test terminal and the mobile network simulator section on the quadrature coordinate.

In the thus configured mobile network simulator apparatus, the distance between the test terminal and the simulative base station displayed on the quadrature coordinate formed on the display screen is obtained by any of an x coordinate and a y coordinate, for example, if the quadrature coordinate is an xy quadrature coordinate, whereby a distance computing speed increases.

In order to achieve the above object, according to a ninth aspect of the present invention, there is provided a mobile network simulator apparatus according to the third aspect, wherein, in the case where the position of the test terminal and the position of the mobile network simulator section are connected by a virtual straight line on the display screen in the connection state display section of the display device, the distance on the display screen is a distance indicated by the virtual straight line.

In the thus configured mobile network simulator apparatus, the distance on the display screen is defined as a distance indicated by a length of a virtual straight line in the case where a distance between a position of a test terminal and a position of a simulative base station on the display screen is connected by the virtual straight line, thus making it possible to easily visually recognize the obtained distance on the display screen and to achieve more intuitive operation.

In order to achieve the above object, according to a tenth aspect of the present invention, there is provided a mobile network simulator apparatus according to the ninth aspect, further comprising a pseudo area display control section (127) which, when the mobile network simulator section (121) has a function as a plurality of mobile network simulators (103c, 104c, 105c), displays on the display screen of the display device (106) each of pseudo communication areas (108, 109, 110) in the plurality of mobile network simulators, each of the pseudo communication areas indicating a communication range between the test terminal and each of the mobile network simulators, and wherein the output level setting means changes each of output levels of transmission signals to the test terminal from each of the mobile network simulators in response to a change of a distance indicated by a length of virtual straight lines on the display screen between each of the mobile network simulators and the test terminal in a portion at which each of the pseudo communication areas are superimposed on each other.

In order to achieve the above object, according to an eleventh aspect of the present invention, there is provided a mobile network simulator apparatus according to the first aspect, wherein the at least one of the connectable connection destinations includes at least one of an actual call destination (10), a server (11), and a TV telephone (Video call terminal) (12).

In order to achieve the above object, according to a twelfth aspect of the present invention, there is provided a mobile network simulator apparatus according to the first aspect, wherein the sequence state display control section displays, as the sequences indicating the communication procedures and communication transition states displayed on the sequence display section, a series of sequences composed of: a "Power OFF" sequence (4a) indicating a power OFF state of the test terminal; a "Release position registration" sequence (4b) indicating a release position registration state of the test terminal; a "Position registration" sequence (4c) indicating a position registration state of the test terminal; a "Standby state" sequence (4d) indicating a standby state of the test terminal; a "Call origination" sequence (4e) indicating a call origination state of the test terminal; a "Call termination" sequence (4f) indicating a call termination state of the test terminal; a "Communication state" sequence (4g) indicating a communication state of the test terminal; an "UE (user equipment: test terminal 8) disconnection" sequence (4h) indicating a disconnection state of the test terminal; and an "NW (network connection destination) disconnection" sequence (4i) indicating a disconnection state from the connection destination by changing a display state according to a transition state when a display is made in a flow chart manner together with an arrow indicating communication procedures and a communication state transition direction among the respective sequences.

In order to achieve the above object, according to a thirteenth aspect of the present invention, there is provided a mobile network simulator apparatus according to the second aspect, wherein, when the connection state display control section graphically displays the test terminal (8), the mobile network simulator section (13), and at least one of a virtual call destination (10a), a virtual server (11a), and a virtual TV telephone (Video call terminal) (12a) serving as the virtual connection destinations on the connection state display section, and graphically displays a plurality of connection lines (14) among the test terminal and at least one of the virtual call destination, the virtual server and the virtual TV telephone (Video call terminal) graphically displayed on the connection state display section, relevant to the mobile network simulator section, the control section displays a display state for the plurality of the connection lines to be changed depending on the presence or absence of connection.

In order to achieve the above object, according to a fourteenth aspect of the present invention, there is provided a mobile network simulator apparatus according to the first aspect, further comprising a connection destination display section (6) which graphically displays on the display screen a virtual connection destination to which the test terminal has been connected via the mobile network simulator section.

In order to achieve the above object, according to a fifteenth aspect of the present invention, there is provided a mobile network simulator apparatus according to the fourteenth aspect, wherein the connection destination display section (6) displays a display section (6a) and an operating section (6b) of the virtual call destination graphically displayed on the display screen.

In order to achieve the above object, according to a sixteenth aspect of the present invention, there is provided a mobile network simulator apparatus according to the first aspect, wherein, when a code division multiple access system such as wideband code division multiple access (W-CDMA) is used as a communication system of the communication circuit, the mobile network simulator section comprises:

an RF input section (15c) which carries out RF input processing for a signal received from the test terminal via a receiver section (15a);

a reception processing section (16) which receives an output from the RF input section;

an input IF processing section (17) which produces as a low frequency the output from the RF input section in the reception processing section;

an inverse diffusion section (18) and a decoder section (19) which sequentially carry out inverse diffusion and decode processing for the signal produced as the low frequency by the input IF processing section in the reception processing section;

a communication control section (20) having incorporated therein a connection destination specifying section (21) which executes a function of an exchanger including at least connection destination specifying based on data decoded by the decoder section to call the connection destination specified by the test terminal;

a transmission processing section (22) which transmits data inputted from the connection destination via the communication control section;

an encoder section (23) which encodes the inputted data in the transmission processing section;

a diffusion section (24) and an output IF processing section (25) which sequentially carry out diffusion processing and high frequency processing for data encoded by the encoder section in the transmission processing section; and an RF output section (15d) which outputs as an RF output signal for a signal processed as the high frequency by the output IF processing section, and the RF output signal output by the RF output section is transmitted to the test terminal via a transmitter section (15b).

In order to achieve the above object, according to a seventeenth aspect of the present invention, there is provided a mobile network simulator apparatus according to the sixteenth aspect, further comprising a sequence state detecting section (26) which detects a current sequence state in a communication test relevant to the test terminal from the communication control section of the mobile network simulator section, wherein the sequence state display control section display on the sequence display section the current sequence state in the communication test relevant to the test terminal based on the sequence state detected by the sequence state detecting section.

In order to achieve the above object, according to an eighteenth aspect of the present invention, there is provided a mobile network simulator apparatus according to the sixteenth aspect, further comprising a connection state detecting section (28) which detects a current connection state in a communication test relevant to the test terminal from the communication control section of the mobile network simulator section, wherein the connection state display control section displays on the connection state display section the current connection state in the communication test relevant to the test terminal based on the connection state detected by the connection state detecting section.

The mobile network simulator apparatus according to the present invention as described above displays a sequence relating to a communication test between a test terminal and a connection destination. In addition to display of this sequence, the simulator apparatus displays a connection state between the test terminal and the connection destination to be linked with display of the sequence.

Therefore, the mobile network simulator apparatus according to the present invention makes it possible for the personnel who executes testing or the like to visually grasp current communication procedures in a series of communication tests of the test terminal and a current connection state of the test terminal; to locate the cause of a failure if the failure occurs in a short time; and to remarkably improve workability of the personnel who executes testing or the like.

In addition, according to the mobile network simulator apparatus of the invention, it is possible to easily grasp the current communication procedures of the test terminal and the communication state of the test terminal, even for the personnel who develops the services provided through the test terminal and the personnel who executes testing, the personnel being unfamiliar with use of the mobile network simulator apparatus.

Further, in the mobile network simulator apparatus according to the invention, a distance between the test terminal and the mobile network simulator section displayed on the connection state display section on the display screen can be changed by simple operation when a connection state between the test terminal and the connection destination is displayed. In addition, a signal level of a communication signal from the mobile network simulator section to the test terminal is automatically defined according to the distance between the test terminal and the mobile network simulator section.

Therefore, the personnel who executes testing can automatically changes the signal level of the communication signal for the test terminal merely by changing the distance between the displayed test terminal and the mobile network simulator section. Thus, test operability can be improved more remarkably by intuitive operation and outline simulation of the distance between the test terminal and the base station in an actual environment can be carried out.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a view showing a connection relationship with a sequence displayed on the display device in the mobile network simulator apparatus shown in FIG. 1;

FIG. 11 is a view showing a connection relationship with a sequence displayed on the display device in the mobile network simulator apparatus shown in FIG. 1;

FIG. 16 is an external view showing a mobile network simulator apparatus according to a third embodiment of the present invention;

FIG. 18 is a block diagram depicting a schematic configuration of the mobile network simulator apparatus shown in FIG. 16;

FIG. 20 is a view showing a connection relationship with a sequence displayed on the display device when a comparative test is carried out by using the mobile network simulator apparatus shown in FIG. 16;

FIG. 24 is a view showing display contents of a display device incorporated in the mobile network simulator apparatus shown in FIG. 23;

FIGS. 27A to 27F are views each showing a technique of moving a test terminal displayed on the display device incorporated in the mobile network simulator apparatus shown in FIG. 23;

DETAILED DESCRIPTION OF THE INVENTION

Figure 1:
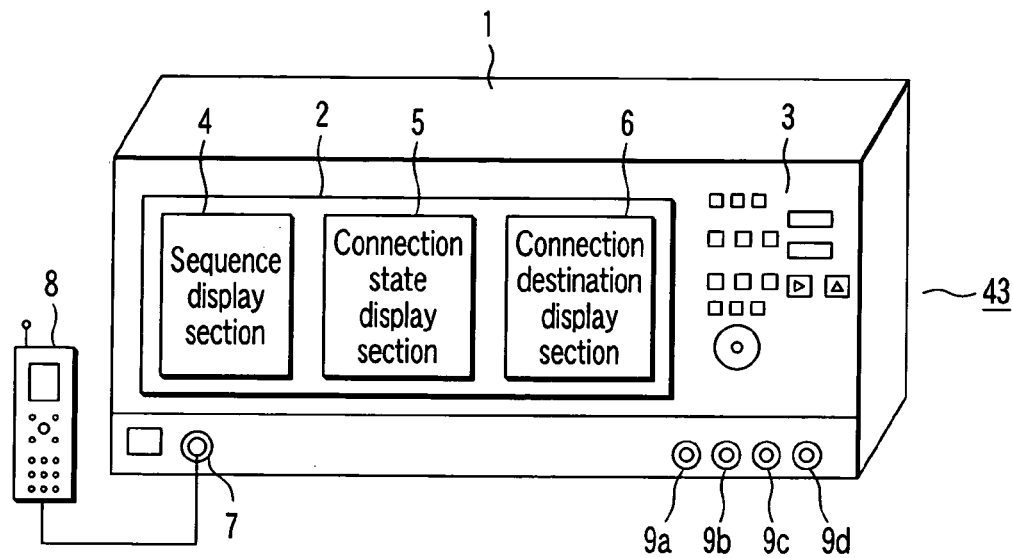
FIG. 1 is an external view showing a mobile network simulator apparatus according to a first embodiment of the present invention.

Reference will now be made in detail to the embodiments of the invention as illustrated in the accompanying drawings, in which like reference numerals designate like or corresponding parts.

Hereinafter, some preferred embodiments of a mobile network simulator apparatus according to the present invention will be described with reference to the accompanying drawings.

First Embodiment

FIG. 1 is an external view showing a mobile network simulator apparatus 43 according to a first embodiment of the present invention.

As shown in FIG. 1, a display device 2 and an operating panel 3 are provided on a front face of a cabinet 1 in the mobile network simulator apparatus 43 according to the first embodiment.

Here, a sequence display section 4, a connection state display section 5, and a connection destination display section 6 as described later are displayed on the display device 2 as required.

Further, on, for example, the front face of the cabinet 1 (hereinafter, referred to as the "front face", but not specified in particular), there are provided: a signal terminal 7 to which a test terminal 8 is to be connected; and signal terminals 9a, 9b, 9c, 9d to which devices serving as connection destinations are to be connected.

While the following description will be given assuming that the signal terminals 9a, 9b, 9c, 9d are provided in plurality, it should be noted that the number of signal terminals may be different depending on a connection mode (for example, the signal terminals can be used in common in the Ethernet (registered trademark)).

Figure 2:
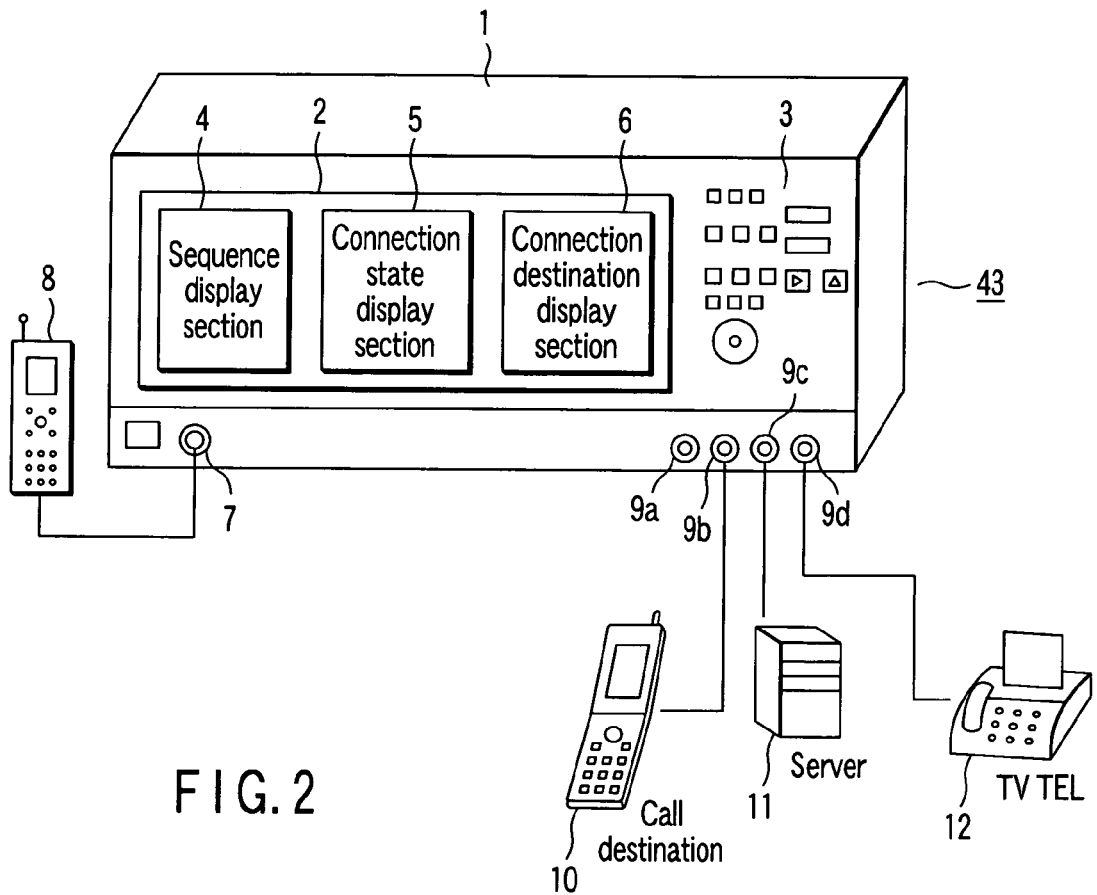
FIG. 2 is a view showing a state in which an actual connection destination has been connected to the mobile network simulator apparatus shown in FIG. 1.

An actual call destination 10, a server 11, and a TV telephone (Video call terminal) 12 serving as connection destinations which can be connected to the test terminal 8 are connected to the signal terminals 9b, 9c, 9d, as shown in FIG. 2, as require.

Figure 4:
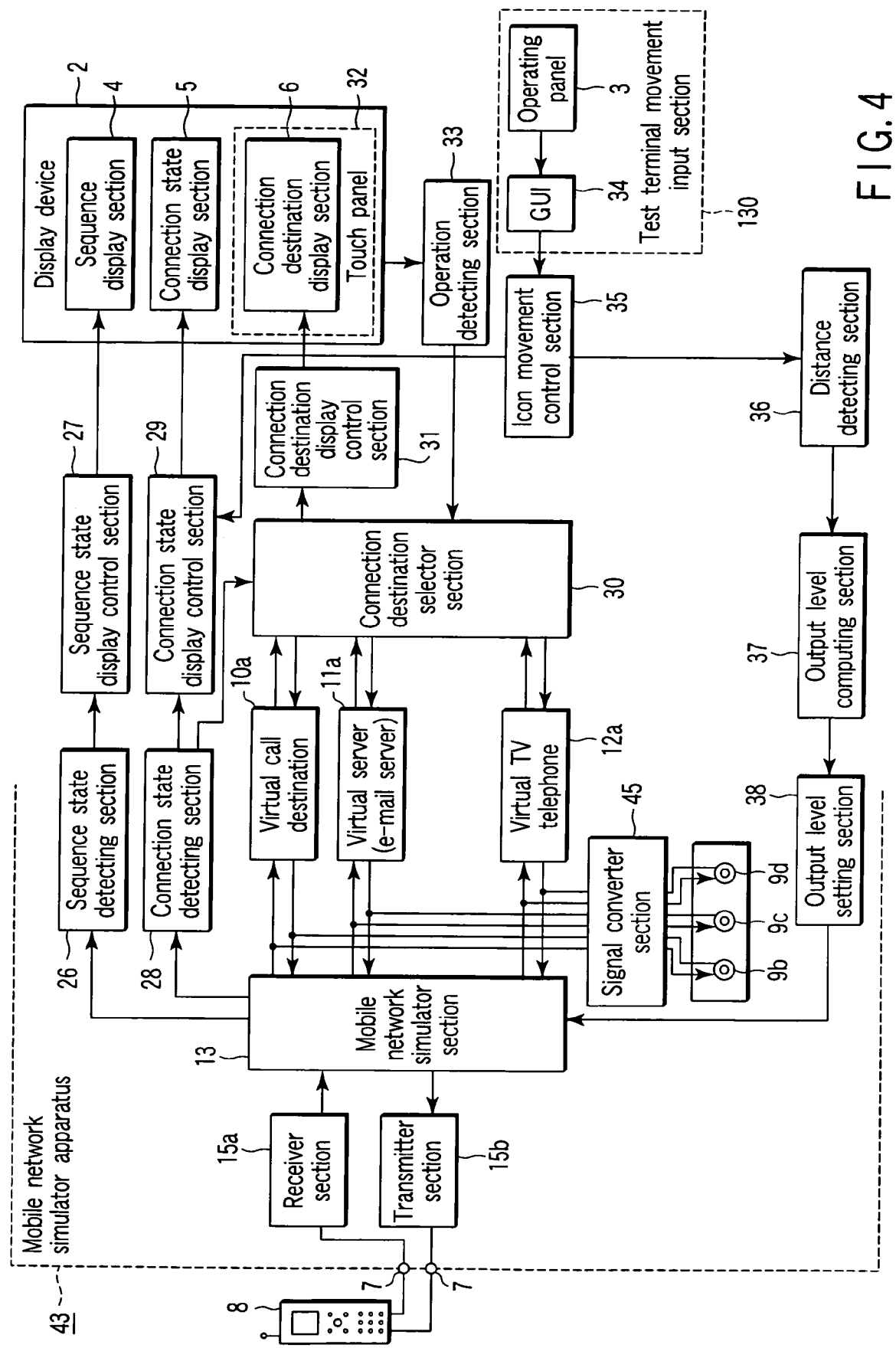
FIG. 4 is a block diagram depicting a schematic configuration of the mobile network simulator apparatus shown in FIG. 1.

Even if the actual call destination 10, server 11, and TV telephone (Video call terminal) 12 are not connected to the signal terminals 9b, 9c, 9d, a virtual call destination 10a, a virtual server 11a, and a virtual TV telephone (Video call terminal) 12a shown in FIG. 4 having functions of the call destination 10, server 11, and TV telephone (Video call terminal) 12 are incorporated in the mobile network simulator apparatus 43, thereby making it possible to function as each of the connection destinations by the virtual connection destination 10a, virtual server 11a, and virtual TV telephone (Video call terminal) 12a incorporated in the mobile network simulator apparatus 43 and making it possible to combine the functions of the connection destinations.

Hereinafter, in the first embodiment, a description will be given with respect to a case in which a communication test is carried out for the test terminal 8 by using each of the virtual connection destinations incorporated in the mobile network simulator apparatus 43.

Figure 3:
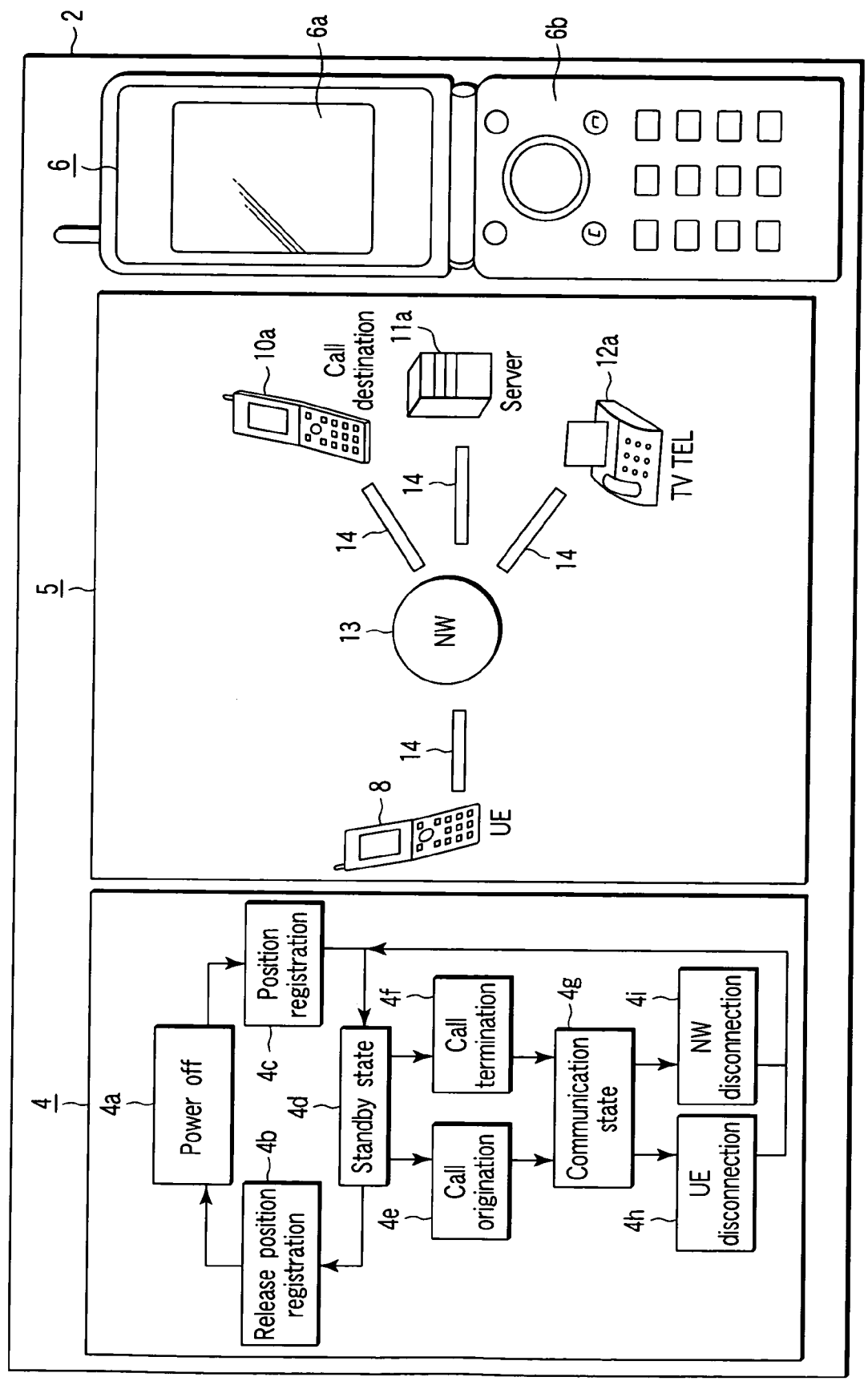
FIG. 3 is a view showing display contents of a display device in the mobile network simulator apparatus shown in FIG. 1.

FIG. 3 is a view showing a detail on the sequence display section 4, connection state display section 5, and connection destination display section 6 displayed on the display device 2.

Here, the sequence display section 4, as shown in FIG. 3, displays a plurality of sequences 4a to 4i as described later which indicates communication procedures and communication transition state between the test terminal 8 and a mobile network simulator section 13 with respect to communication with the virtual connection destinations 10a, 11a, 12a via the test terminal 8 and a pseudo base station section 13.

In the case as described later where the displayed sequence display section 4 is switched to a display of a sequence which indicates the communication procedures and communication transition state between any one of the connected virtual connection destinations 10a, 11a, 12a and the mobile network simulator section 13, a switching button (not shown) is selected by using the operating panel 3 and an externally connected mouse (not shown) etc., and a connection destination displayed on the connection state display section 5 is directly selected, thereby making it possible to achieve its switch display.

The following description will be given assuming that the sequence display section 4 displays the sequence which indicates the communication procedures and communication transition state between the test terminal 8 and the mobile network simulator section 13.

Specifically, the sequence display section 4, as shown in FIG. 3, is designed such that, as the sequences indicating the communication procedures and communication transition state, a series of sequences indicating the communication procedures and communication transition state are displayed to change a display state according to a transition state when they are displayed in the shape of a flow chart together with the arrow indicating the communication procedures and the communication state transition direction between the sequences, by means of a sequence state display control section 27 to be described later. The series of the sequences is composed of: a "Power OFF" sequence 4*a* indicating a power OFF (Power Off) state of the test terminal; a "Release registration" sequence 4*b* indicating a release registration (Detach) state of the test terminal; a "Position registration" sequence 4*c* indicating a position registration (Registration) state of the test terminal; a "Standby state" sequence 4*d* indicating a standby (Idle) state of the test terminal; a "Call origination" sequence 4*e* indicating a call origination (Origination) state of the test terminal; a "Call termination" sequence 4*f* indicating a call termination (Termination) state of the test terminal; a "Communication state" sequence 4*g* indicating a communication (Communication) state of the test terminal; an "UE: user equipment (test terminal 8) disconnection" sequence 4*h* indicating a disconnection (UE Release) state of the test terminal; and an "NW: network (connection destination) disconnection" sequence 4*i* indicating a disconnection (NW Release) state from the connection destination.

The arrow among the sequences 4*a* to 4*i* in the sequence display section 4 indicates the communication procedures and the communication state transition direction.

Here, the fact that each of the sequences is displayed while the display state is changed according to the transition state denotes that, when the transition state of the sequence is established, a display state different from the current display state is displayed while a display color is changed or while display brightness is changed, for example.

The following description will be given with respect to a case in which, assuming that the current display state is in an inactive state, the display state of the sequence enters an active state when the transition state of the sequence is established.

In addition, the connection state display section 5 displays a connection state between the test terminal 8 and each of the virtual connection destinations via the mobile network simulator section 13, as shown in FIG. 3.

Specifically, the connection state display section 5 displays icons obtained when the test terminal 8, the mobile network simulator section 13, and the virtual call destination 10*a*, virtual server 11*a*, and vertical TV telephone (Video call terminal) 12*a* serving as the virtual connection destinations are graphically displayed, respectively. In addition, when a plurality of connection lines 14 are graphically displayed among the test terminal 8, the virtual call destination 10*a*, the virtual server 11*a*, and the virtual TV telephone (Video call terminal) 12*a* for the mobile network simulator section 13, the display state is displayed to be changed according to the presence or absence of connection.

Here, the fact that, when a plurality of connection lines 14 are graphically displayed, the display state is displayed to be changed according to the presence or absence of connection denotes that the above connection lines are displayed while the display color of the corresponding connection line 14 is changed according to the presence or absence of connection or while the display brightness is changed.

The following description will be given with respect to a case in which, assuming that the display state when the connection line 14 is not connected is in an inactive state, the display state enters an active state when the connection line 14 is connected.

In addition, the connection destination display section 6 indicating one virtual connection destination to which the test terminal 8 is connected via the mobile network simulator section 13 displays a connection destination composed of a display section 6*a* and an operating section 6*b*.

In FIG. 3, the connection destination display section 6 graphically displays the virtual call destination 10*a* as a state in which the virtual call destination 10*a* is selected as a connection destination.

FIG. 4 is a block diagram depicting a schematic configuration of the mobile network simulator apparatus 43 according to the first embodiment.

That is, a signal from the test terminal 8 is received by a receiver section 15*a*, and the received signal is inputted to the mobile network simulator section 13, as shown in FIG. 4.

The signal from the mobile network simulator section 13 is transmitted to the test terminal 8 via a transmitter section 15*b*.

Figure 5:
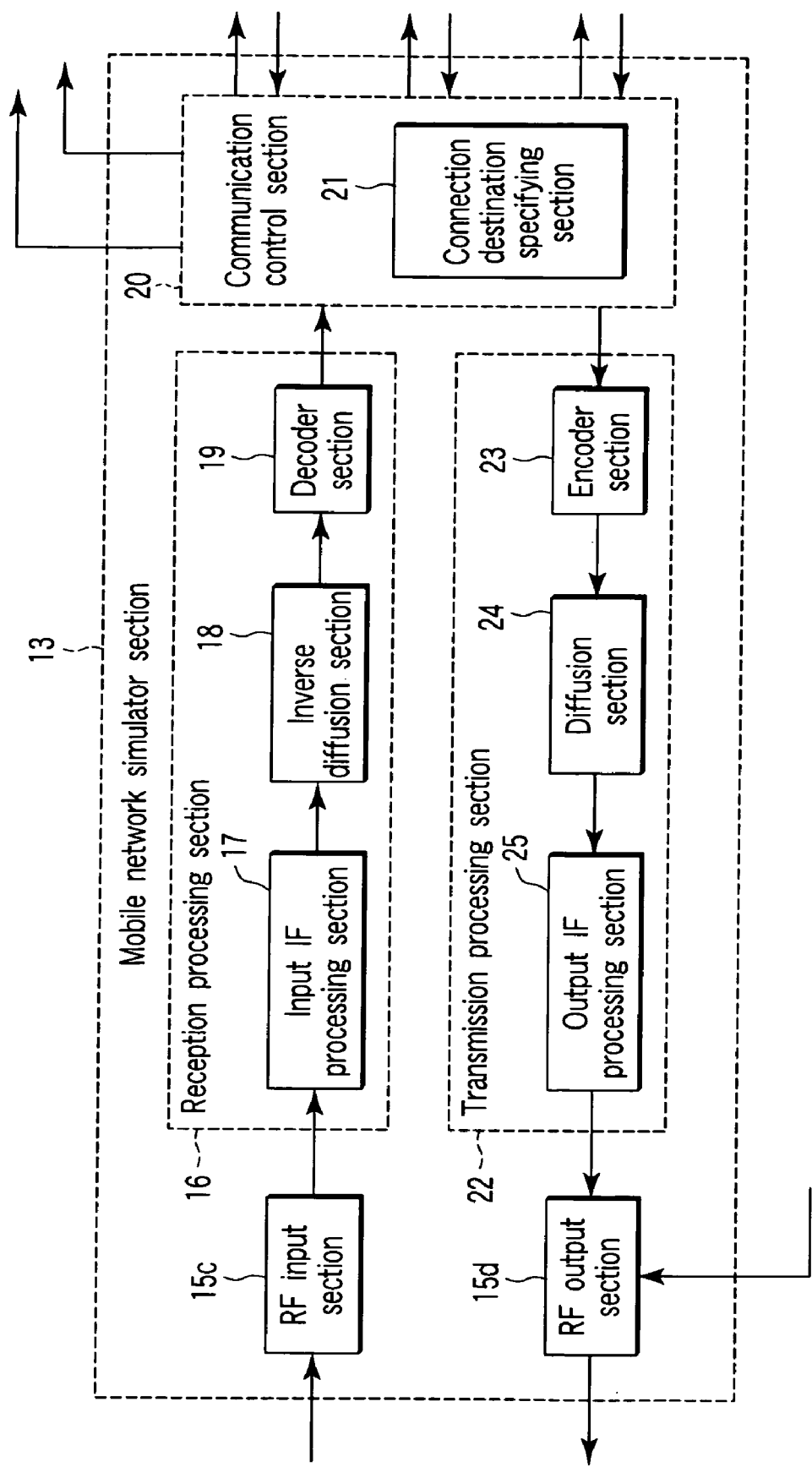
FIG. 5 is a block diagram depicting a detailed configuration of a mobile network simulator section incorporated in the mobile network simulator apparatus shown in FIG. 1.

FIG. 5 is a block diagram depicting a schematic configuration of the mobile network simulator section 13 in the case where a code division multiple access system such as wideband code division multiple access (W-CDMA) is used as a communication system.

That is, the mobile network simulator section 13 comprises an RF input section 15*c*, a reception processing section 16, an input IF processing section 17, an inverse diffusion section 18, a decoder section 19, a communication control section 20, a transmission processing section 22, an encoder section 23, a spreading section 24, an output IF processing section 25, and an RF output section 15*d*. The RF input section 15*c* carries out RF (high frequency) input processing for a signal received from the terminal targeted for resting 8 via the receiver section 15*a*. The reception processing section 16 receives an output from the RF input section 15*c*. The input IF processing section 17 carries out input IF (intermediate frequency) processing for producing the output from the RF input section 15*c* as a low frequency in the reception processing section 16. The inverse diffusion section 18 and decoder section 19 sequentially carry out inverse diffusion processing and decode processing for the signal produced at a low frequency by the input IF processing section 17 in the reception processing section 16. The communication control section 20 has incorporated therein a connection destination specifying section 21 for executing a function of an exchanger which includes a connection destination selection or the like based on data decoded by the decoder section 19 to call the virtual connection destinations 10*a*, 11*a*, 12*a* (connection destinations 10, 11, 12 if available) specified by the test terminal 8. In this case, the connection specifying section 21 may be specified from the connection destinations to the test terminal 8. The transmission processing section 22 transmits the data inputted from the virtual connection destinations 10*a*, 11*a*, 12*a* (connection destination 10, 11, 12 if available) via the communication control section 20. The encoder section 23 encodes the inputted data in the transmission processing section 22. The diffusion section 24 and output IF processing section 25 sequentially carry out diffusion processing and high frequency processing for the data encoded by the encoder section 23 incorporated in the transmission processing section 22. The RF output section 15*d* outputs an RF output signal for a signal produced at a high frequency by the output IF processing section 25.

That is, in the mobile network simulator section 13 configured as described above, the signal which has been RF output processed by the RF output section 15*d* is transmitted to the test terminal 8 via the transmitter section 15*b*.

In the mobile network simulator section 13, the signal received by the receiver section 15*a* is inputted to the input IF processing section 17 incorporated in the reception processing section 16 via the RF input section 15*c*.

Then, this received signal is produced at a low frequency by the input IF processing section 17, and then, the resulting signal is inputted as decoded data to the communication control section 20 via the de-spreading section 18 which carries out de-spreading and the decoder section 19 which carries out decode processing.

Here, the communication control section 20 having the connection destination specifying section 21 incorporated therein executes a function of an exchanger which includes connection destination selection or the like on the basis of the data decoded by the decoder section 19 to call the virtual connection destinations 10*a*, 11*a*, 12*a* (connection destinations 10, 11, 12 if available) specified by the test terminal 8.

In addition, the communication control section 20 delivers the data inputted from the virtual connection destinations 10*a*, 11*a*, 12*a* (connection destinations 10, 11, 12 if available) to the encoder section 23 incorporated in the transmission processing section 22.

Then, the data encoded by the encoder section 23 is outputted to the transmitter section 15*b* via the diffusion section 24 which carries out diffusion processing; the output IF processing section 25 which carries out high frequency processing; and the RF output section 15*d*.

A sequence state detecting section 26 shown in FIG. 4 detects a current sequence in a communication test relevant to the test terminal 8 from the communication control section 20 of the mobile network simulator section 13.

Then, the sequence state detected by the sequence state detecting section 26 is displayed on the sequence display section 4 of the display device 2 as a current sequence state in the communication test relevant to the test terminal 8 via the sequence state display control section 27.

A connection state detecting section 28 detects a current connection state in the communication test relevant to the test terminal 8 from the communication control section 20 of the mobile network simulator section 13.

Then, the connection state detected by the connection state detecting section 28 is displayed on the connection state display section 5 of the display device 2 as a current connection state in the communication test relevant to the test terminal 8 via a connection state display control section 29.

To the communication control section 20 of the mobile network simulator section 13, signal terminals 9*b*, 9*c*, 9*d* are connected via a signal converter section 45 for converting a signal as an interface among the virtual call destination 10*a*, the virtual server 11*a*, the virtual TV telephone (Video call terminal) 12*a*, and equipment serving as a connection destination.

A connection destination selector section 30 selects a current virtual connection destination (10*a*, 11*a*, 12*a*) from the current connection state in the communication test relevant to the test terminal 8 detected by the connection state detecting section 28.

Then, the virtual connection destination selected by the connection destination selector section 30 is displayed on the connection destination display section 6 of the display device 2 as a current connection destination in the communication test relevant to the test terminal 8 via a connection destination display control section 31.

A touch panel 32 is attached onto a front face of the connection destination display section 6 of the display device 2. When the personnel which executes testing operates the operating section 6*b* via the touch panel 32, an operation detecting section 33 detects operating information and delivers the detected information to the corresponding virtual connection destination (10*a*, 11*a*, 12*a*) via the connection destination selector section 30.

Figure 12:
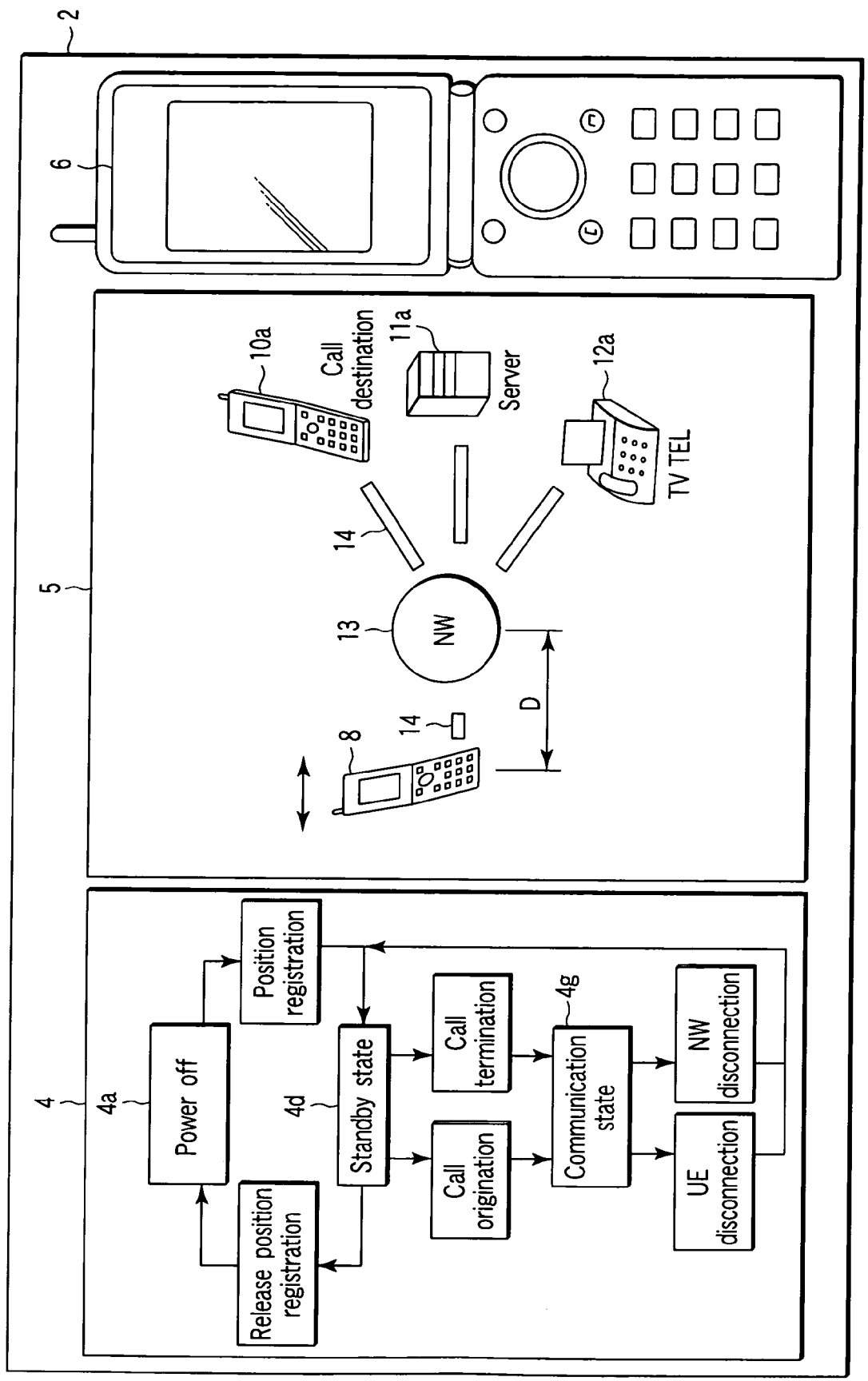
FIG. 12 is a view showing the display contents of the display device in the mobile network simulator apparatus shown in FIG. 1.

A graphical user interface (GUI) 34 and an icon movement control section 35 configuring a test terminal move input section 130 together with the operating panel 3 move the test terminal 8 displayed as an icon graphically displayed on the connection state display section 5 of the display device 2 as indicated by the illustrative arrow, as shown in FIG. 12, in accordance with the operation of the operating panel 3 by the personnel who executes testing. The above interface and control section then change a distance D on the display screen between the test terminal 8 and the mobile network simulator section (NW) 13.

The distance D on the display screen between the test terminal 8 and the mobile network simulator section (NW) 13 is detected by a distance detecting section 36.

An output level computing section 37 computes an output level of a transmission signal from the mobile network simulator section 13 to the test terminal 8 on the basis of the distance D detected by the distance detector section 36.

An output level setting section 38 sets the computed output level to the RF output section 15*d* incorporated in the mobile network simulator section 13.

Specifically, when the displayed distance D is increased, the output level setting section 38 decreases the level of the transmission signal to the test terminal 8 from the mobile network simulator section 13 according to the increased distance. In addition, when the displayed distance D is decreased, this setting section increases the level of the transmission signal from the mobile network simulator section 13 according to the decreased distance.

In this manner, a relationship between an actual test terminal and a base station can be simulated, thus making it possible to carry out more types of tests for the test terminal 8.

An operation for changing the distance D on the display screen between the test terminal 8 and the mobile network simulator section 13 may be carried out by an externally connected mouse or the like other than the operating panel 3.

Then, the mobile network simulator apparatus 43 according to the present invention has: the mobile network simulator section 13, the sequence state display control section 27, and the connection state display control section 29. The mobile network simulator section 13 is basically interposed between the test terminal which is a subject of measurement and at least one of the connection destinations 10, 11, 12 (these may be the virtual connection destinations 10*a*, 11*a*, 12*a*, the same in follows) which can be connected to the test terminal 8. The mobile network simulator section 13 has a function as at least one mobile network simulator which forms a communication line between the test terminal 8 and each of the connection destinations 10, 11, 12 according to a connection request from the test terminal 8 and any one of the connection destinations 10, 11, 12 to the other one and which disconnects the communication line according to a disconnection request from the any one or the other one. The sequence state display control section 27 displays on the sequence display section 4 of the display device 2 the sequences 4a to 4i which indicate at least one of the communication procedures and the communication transition states between the test terminal 8 and the mobile network simulator section 13 and between each of the connection destinations 10, 11, 12 and the mobile network simulator section 13 with respect to a series of communication tests between the test terminal 8 and each of the connection destinations 10, 11, 12 connected via the communication line formed by the mobile network simulator section 13. The connection state display control section 29 associates the connection state between the test terminal 8 and each of the connection destinations 10, 11, 12 via the mobile network simulator section 13 with the communication transition state and links the associated state with a display of a sequence by the sequence state display control section 27, thereby displaying on the connection state display section 5 of the display device 2.

Now, with reference to FIGS. 6 to 11, a description will be given with respect to operations carried out by the personnel who executes testing and transition of a display state of the display device 2 in order to carry out a series of communication tests for the test terminal 8 composed of, for example, a mobile communication terminal in the mobile network simulator apparatus of the first embodiment configured as described above.

First, the personnel who executes testing connects the test terminal 8 to the signal terminal 7 of the mobile network simulator 43, and start up the mobile network simulator apparatus 43, as described previously.

Figure 6:
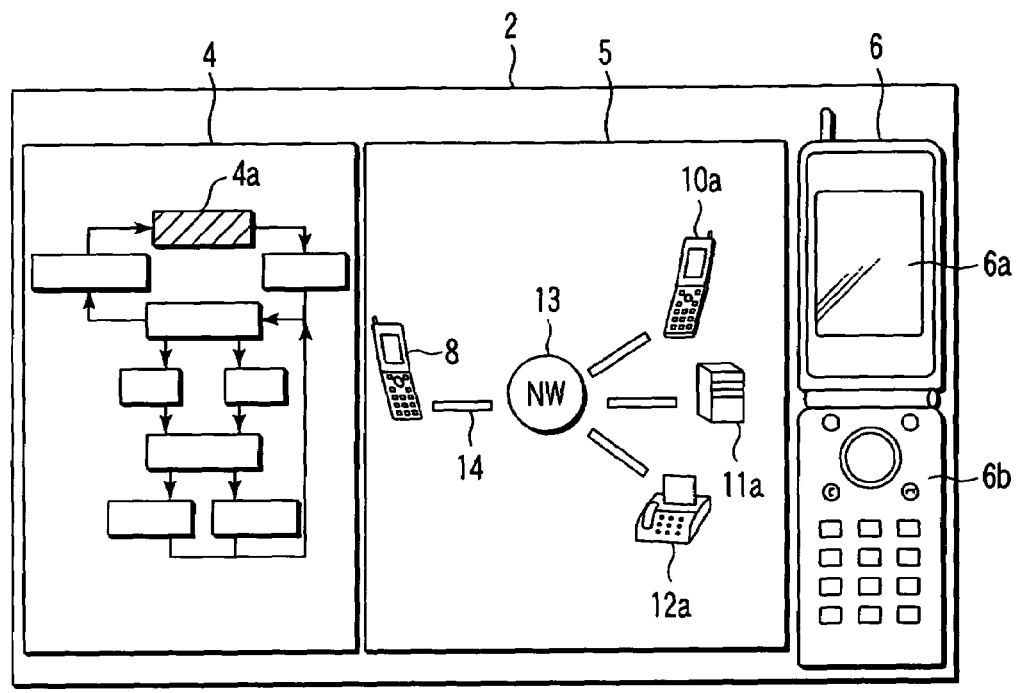
FIG. 6 is a view showing a connection relationship with a sequence displayed on the display device in the mobile network simulator apparatus shown in FIG. 1.

In this manner, as shown in FIG. 6, the "power OFF" sequence 4a in the sequence display section 4 of the display device 2 is turned ON to indicate a current transition state of the test terminal 8.

In this state, each of the connection lines 14 of the connection state display section 5 is not turned ON. However, even if the test terminal 8 is not connected, a similar display may be made.

Figure 7:
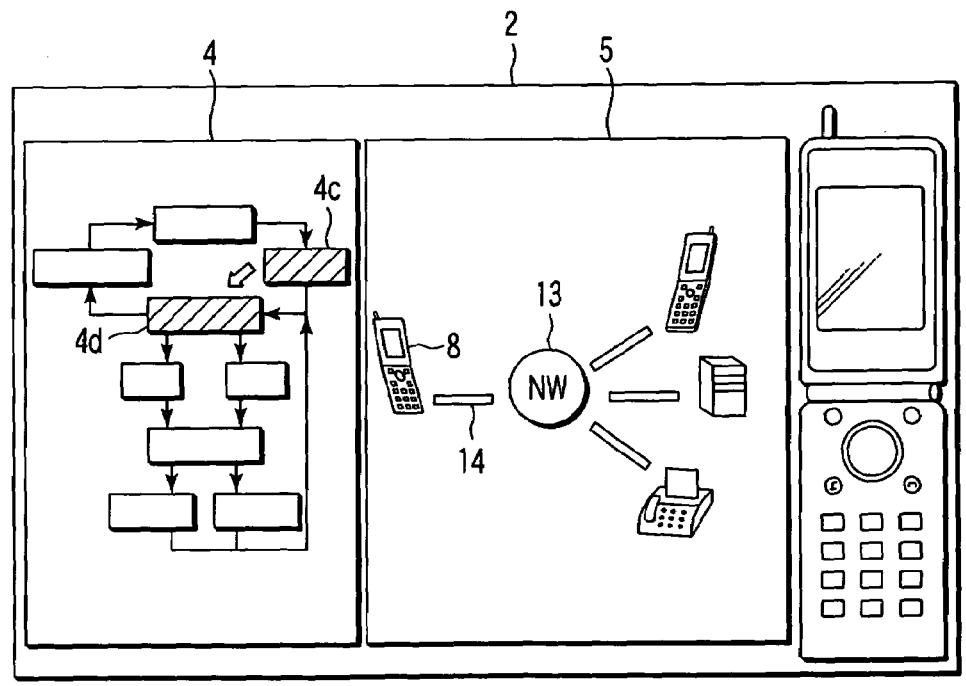
FIG. 7 is a view showing a connection relationship with a sequence displayed on the display device in the mobile network simulator apparatus shown in FIG. 1.

Next, when the personnel who executes testing turns ON the power supply of the test terminal 8, the "position registration" sequence 4c in the sequence display section 4 is turned ON for a short time, and then, the "standby state" sequence 4d is turned ON, as shown in FIG. 7.

Figure 8:
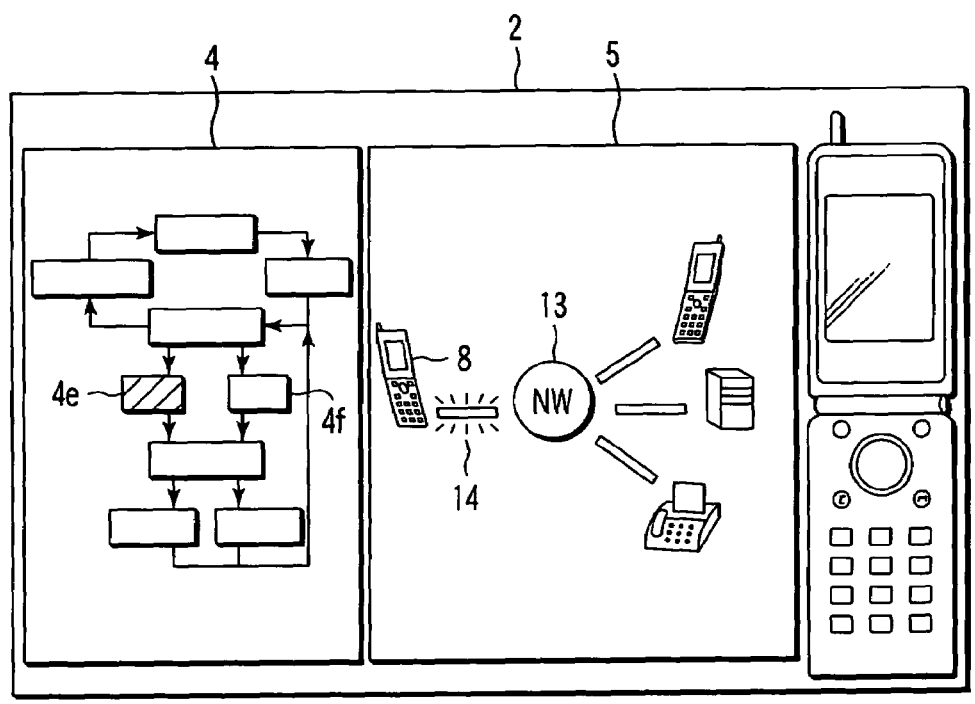
FIG. 8 is a view showing a connection relationship with a sequence displayed on the display device in the mobile network simulator apparatus shown in FIG. 1.

Subsequently, when the personnel who executes testing makes dialing operation to specify one of the connection destinations (10a, 11a, 12a), the "call origination" sequence 4e in the sequence display section 4 is turned ON, and at the same time, the connection line 14 blinks between the test terminal 8 and the mobile network simulator section (NW) 13 displayed on the connection state display section 5, as shown in FIG. 8.

In the case where a call signal is outputted to specify the test terminal 8 from the mobile network simulator section (NW) 13, the "call termination" sequence 4f in the sequence display section 4 is turned ON.

Figure 9:
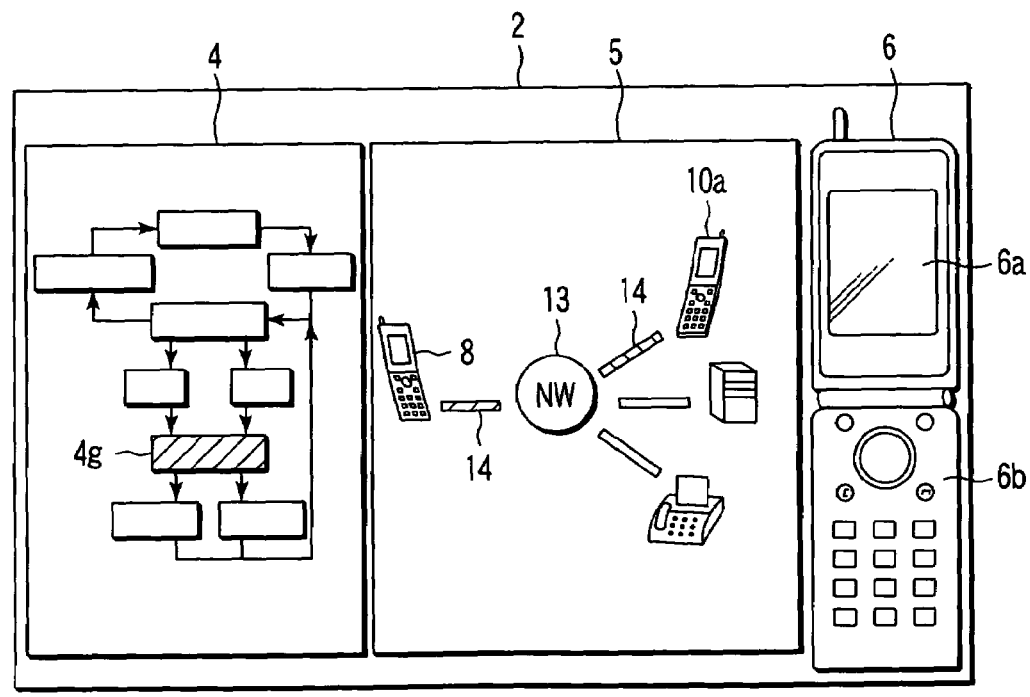
FIG. 9 is a view showing a connection relationship with a sequence displayed on the display device in the mobile network simulator apparatus shown in FIG. 1.

For example, when the personnel who executes testing specifies the virtual call destination 10a as a connection destination (10a, 11a, 12a), the virtual call destination 10a is displayed on the connection destination display section 6, as shown in FIG. 9.

When the personnel who executes testing makes an off-hook operation at the operating section 6b displayed on the connection destination display section 6 by using the touch panel 32 or the like, a communication line is formed between the test terminal 8 and the virtual call destination 10a via the mobile network simulator section 13.

In this manner, as shown in FIG. 9, the "communication state" sequence 4g in the sequence display section 4 is turned ON, and at the same time, the connection line 14 between the test terminal 8 and the mobile network simulator section (NW) 13 in the connection state display section 5 and the connection line 14 between the mobile network simulator section (NW) 13 and the virtual call destination 10a are turned ON.

Furthermore, if the virtual connection call 10a is a calling state, in order to indicate the calling state, the connection line between the mobile network simulator section 13 and the virtual call destination 10a may be blinked.

When a series of check tests such as a communication quality, a call quality, and a provided service execution state is terminated via the mobile network simulator section 13 between the test terminal 8 in a state in which a communication line is formed and the virtual call destination 10a serving as a connection destination, the personnel who executes testing makes an on-hook operation for the test terminal 8 to disconnect the communication line.

In this manner, as shown in FIG. 10, the "UE disconnection" sequence 4h in the sequence display section 4 is turned ON, and at the same time, the connection line 14 blinks between the test terminal 8 and the mobile network simulator section (NW) 13 in the connection state display section 5.

In the case where the communication line has been disconnected from the virtual call destination 10a serving as a connection destination, the "NW disconnection sequence 4i in the sequence display section 4 is turned ON, and the connection line 14 blinks between the virtual call destination 10a and the mobile network simulator section (NW) 13 in the connection state display section 5.

When the communication line between the test terminal 8 and the virtual call destination 10a serving as a connection destination is completely disconnected, the "standby state" sequence 4d in the sequence display section 4 is turned ON, and the connection line 14 between the test terminal 8 and the mobile network simulation section (NW) 13 in the connection state display section 5 and the connection line 14 between the mobile network simulator section (NW) 13 and the virtual call destination 10a are turned OFF, as shown in FIG. 11.

In addition, in the case where a connection request is made from the side of the virtual call destination 10a serving as a connection destination to the test terminal 8, the personnel who executes testing makes an operation from the operating section 6b displayed at the connection destination display section 6 in accordance with the procedures similar to those as described above (provided if orientation is reversed). As a result, connection is started from the side of the virtual call destination 10a, the connection line 14 blinks between the virtual call destination 10a and the mobile network simulator section (NW) 13 in the connection state display section 5, and then, a communication line is formed.

At this time, in the case where the test terminal 8 is selected (in the case where the above-described state is kept unchanged), a display relevant to a call termination operation between the mobile network simulator section 13 and the test terminal 8 is made on the sequence display section 4.

When a selection is made for a display which indicates the virtual call destination 10a displayed on the connection state display section 5 by the operating panel 3 and an externally connected mouse (not shown) or when a switching button (not shown) is selected, a display relating to the call and reception origination operations between the virtual call destination 10a and the mobile network simulator section 13 is made on the sequence display section 4.

In the case where both of the test terminal 8 and the virtual call destination 10a are selected by an operation for selecting the display of the sequence display section 4, the displays of two sequences are made to indicate the respective communication procedures and communication transition states between the test terminal 8 and the mobile network simulator section 13 and between the virtual call destination 10a and the mobile network simulator section 13.

In this manner, on the display section 2, a connection state between the test terminal 8 and the connection destination (10a, 11a, 12a) displayed on the connection state display section 5 by means of the connection state display control section 29 is displayed to be linked with a display of the sequence in addition to the "power OFF" sequence 4a, the "position registration release" sequence 4b, the "position registration" sequence 4c, the "standby state" sequence 4d, the "call origination" sequence 4e, the "call termination" sequence 4f, the "communication state" sequence 4g, the "UE (test terminal 8) disconnection" sequence 4h, and the "NW (connection destination) disconnection" sequence 4i, relevant to a communication between the test terminal 8 and the connection destination (10a, 11a, 12a) displayed on the sequence display section 4 by means of the sequence state display control section 27.

The contents of the sequence displayed on the sequence display section 4 by means of the sequence state display control section 27 may be different from those of the above-described sequences 4a to 4i according to a place selected to display the sequence (for example, between the virtual call destination 10a or virtual server 11a or virtual TV telephone (Video call terminal) 12a and the mobile network simulator section 13).

Therefore, the personnel who executes testing can visually grasp the current communication procedures and connection states in a series of connection tests relevant to the test terminal 8 on the basis of the display of the connection state displayed on the display device 2 to be linked with the sequence display; can locate the cause of a failure when the failure occurs in a short time; and can improve workability of the personnel who executes testing remarkably.

In addition, the personnel who executes testing, for example, moves the test terminal 8 displayed on the connection state display section 5 of the display device 2 in the "standby state" sequence 4d and the "communication state" sequence 4g displayed on the sequence display section 4 of the display device 2, and changes the distance D on the display screen relevant to the mobile network simulator section (NW) 13 by the test terminal movement input section 130 and the icon movement control section 35 composed of the operating panel 3 and the GUI 34, thereby making it possible to change the level of the transmission signal relevant to the test terminal 8 from the mobile network simulator section (NW) 13.

A detail on changing the level of the transmission signal relevant to the test terminal 8 according to the distance D on the display screen will be described in a fourth embodiment described later.

Therefore, even in the case where a distance between the test terminal 8 and the mobile network simulator section (NW) 13 has been changed, whereby the state of connection with the sequence indicating the communication procedures and communication transition states in the communication tests relevant to the test terminal 8 has been changed by receiving an effect on level change of the transmission signal from the mobile network simulator section (NW) 13, the personnel who executes testing can easily grasp these changes by means of the display caused by the sequence display section 4 and the connection state display section 5.

As described previously, the mobile network simulator section 43 can execute a communication test relevant to the test terminal 8 by using the actual call destination 10, server 11, and TV telephone (Video call terminal) 12 connected to the signal terminals 9b, 9c, 9d instead of the virtual call destination 10a, vertical server 11a, and virtual TV telephone (Video call terminal) 12a.

Second Embodiment

Figure 13:
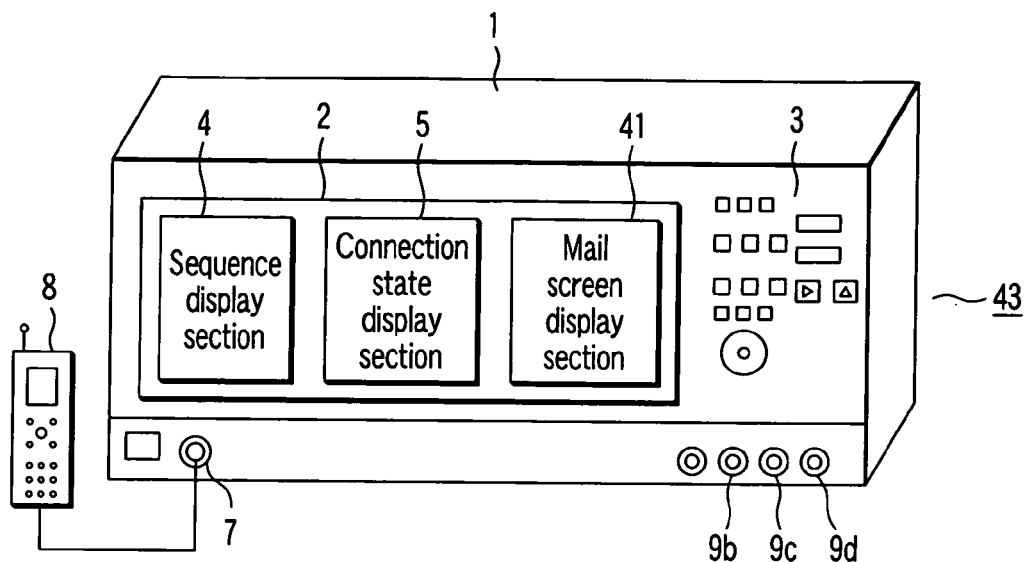
FIG. 13 is an external view showing a mobile network simulator apparatus according to a second embodiment of the present invention.

FIG. 13 is an external view showing a mobile network simulator apparatus 43, i.e., a pseudo base station apparatus according to a second embodiment of the present invention.

In FIG. 13, similar constituent elements to those of the mobile network apparatus 43 of the first embodiment shown in FIG. 1 described previously are designated by like reference numerals, and a duplicate detailed description is omitted here.

In the mobile network simulator apparatus 43 according to the second embodiment, the sequence display section 4, the connection state display section 5, and a mail screen display section 41 are displayed on the display section 2 as required.

Figure 14:
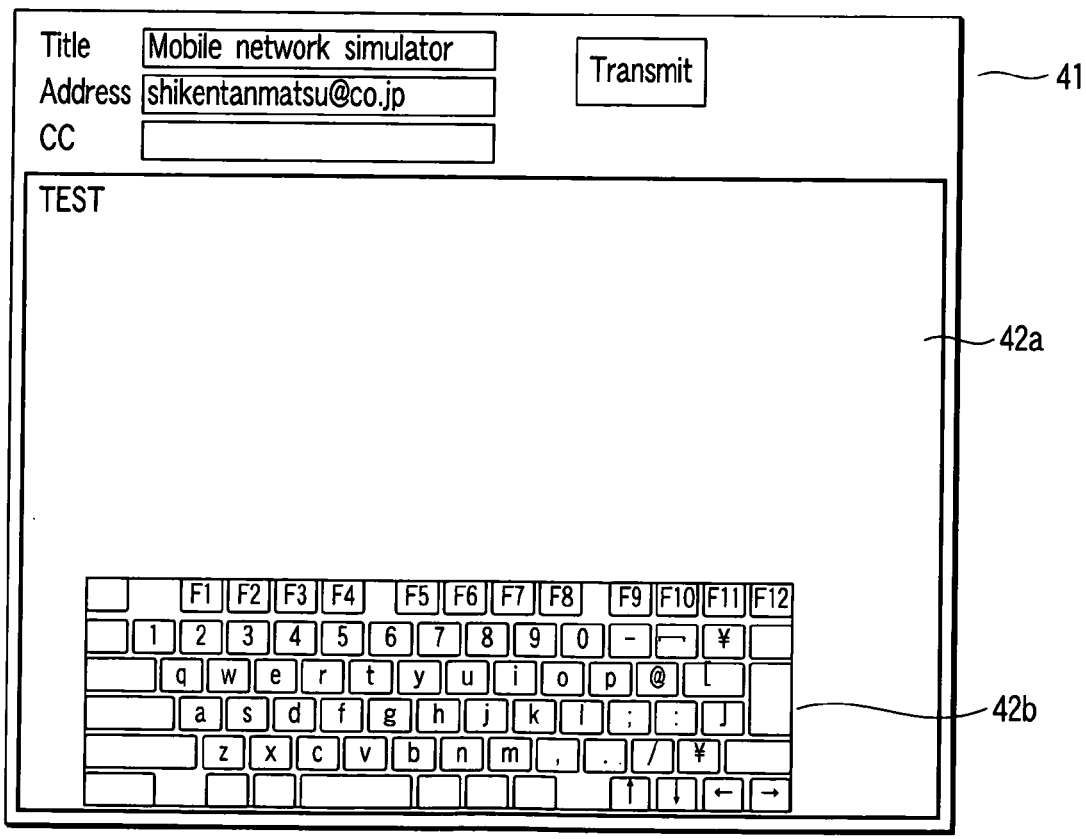
FIG. 14 is a view showing a detail on display contents of a mail application in the mobile network simulator apparatus shown in FIG. 13.

On the mail screen display section 41 from among them, a display section 42a and an input section 42b are displayed as shown by example of the screen for producing a transmission mail shown in FIG. 14.

Figure 15:
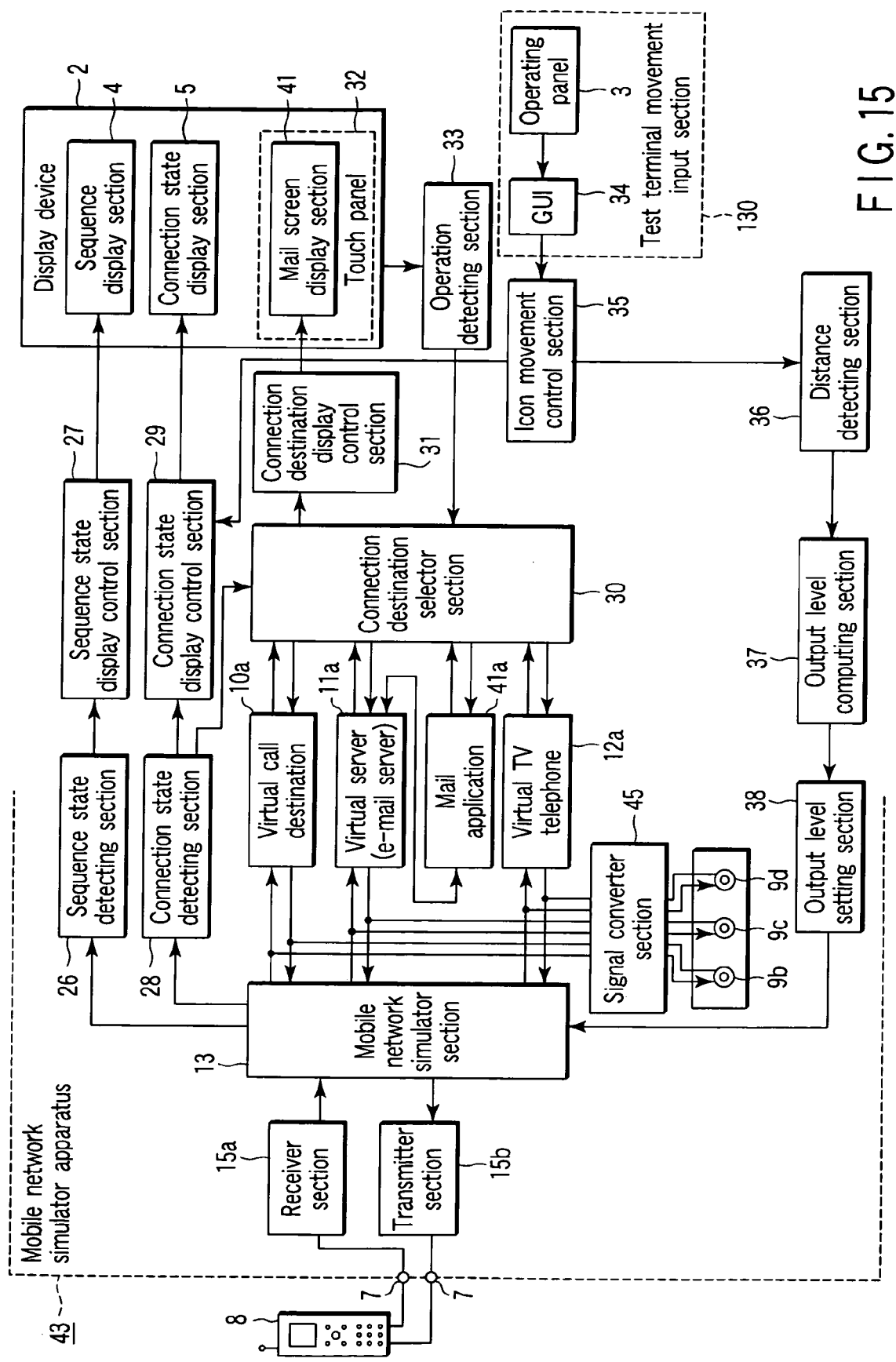
FIG. 15 is a block diagram depicting a schematic configuration of the mobile network simulator apparatus shown in FIG. 13.

FIG. 15 is a block diagram depicting a schematic configuration of the mobile network simulator apparatus 43 according to the second embodiment.

In FIG. 15, similar constituent elements to those of the mobile network simulator 43 according to the first embodiment shown in FIG. 4 described previously are designated by like reference numerals, and a duplicate detailed description is omitted here.

In the mobile network simulator apparatus 43 according to the second embodiment, an E-mail server is employed as the virtual server 11a which is one of the connection destinations, and a mail application 41a is connected to the E-mail server.

The connection destination display control section 31 displays on the display device 2 the selected virtual connection destination as a current connection destination. In addition, in the case where the virtual server 11a has been selected, the mail screen display section 41 using the mail application 41a connected to the virtual server 11a is displayed on the display section 2, as shown in FIG. 14.

In a state in which the mail screen display section 41 has been displayed on the display section 2, it is possible to browse contents of an E-mail received by the E-mail server and operate the input section 42b via the touch panel 32 by the personnel who executes testing, thereby making it possible to carry out an edit work including writing the contents of transmission caused by the E-mail to the display section 42a.

Then, the contents of transmission written in the display section 42a are delivered, in response to detect depression of a transmission button by the operation detecting section 33, to the mail address destinated as destination via the virtual call destination 10a as the E-mail server.

That is, the personnel who executes testing operates the mail screen display section 41 on the display screen, thereby making it possible to execute transmission and receiving of the E-mail relevant to and from the virtual server 11a serving as an E-mail server.

In the thus configured mobile network simulator apparatus 43 according to the second embodiment, the test terminal 8 is connected to the virtual server 11a of the E-mail server via the mobile network simulator section 13 when the personnel who executes testing operates the test terminal 8 having an E-mail transmission/reception function and specifies an E-mail address managed by the virtual server 11a serving as an E-mail server which is a connection destination.

In this manner, the E-mail transmitted from the test terminal 8 is delivered to the virtual server 11.

The E-mails stored in the accounts of the corresponding E-mail address of the virtual server 11a are taken out by the mail application 41a, and the taken out E-mail is displayed on the display section 41a of the mail screen display section 41 displayed on the display device 2.

Further, in E-mail reception by the test terminal 8, the personnel who executes testing specifies the mail address of the test terminal 8 from the input section 41b on the mail screen display section 41 and executes the transmission operation, whereby the contents of the mail are transmitted to the accounts of the nail address of the test terminal 8.

The E-mail transmitted to the test terminal 8 is stored in the virtual server 11a serving as an E-mail server.

In the case where the virtual server 11a serving as the E-mail server has a function for calling the test terminal 8, the test terminal 8 is called by using the function, whereby the test terminal 8 can receive the E-mail from the virtual server 11a serving as an E-mail server.

In the case where the virtual server 11a serving as an E-mail server does not have a function for calling the test terminal 8, a connection is requested from the test terminal 8 to the virtual server 11a, whereby the test terminal 8 can take out and receive the E-mail from the virtual server 11a serving as an E-mail server.

Therefore, the personnel who executes testing can check (test) an operation of an E-mail function which the test terminal 8 has by executing E-mail exchange with the mail application 41a provided in the mobile network simulator apparatus 43.

An actual server 11 connected to the signal terminal 9c can be used instead of the virtual server 11a serving as an E-mail server.

Third Embodiment

FIG. 16 is an external view showing one set of two mobile network simulator apparatuses 43, 43a according to a third embodiment of the present invention.

In FIG. 16, similar constituent elements to those of the mobile network simulator apparatus 43 according to the first embodiment shown in FIG. 1 described previously are designated by like reference numerals, and a duplicate detailed description is omitted here.

In the third embodiment, one set of one mobile network simulator apparatus 43 and the other mobile network simulator apparatus 43a having the same configuration as the apparatus 43 is used.

In these mobile network simulator apparatuses 43, 43a, signal terminals 9a, 9a are connected via a signal cable 44.

In addition, one test terminal 8 is connected to the signal terminal 7 of one mobile network simulator apparatus 43, and another test terminal 8 is connected to the signal terminal 7 of the other mobile network simulator apparatus 43a.

Figure 17:
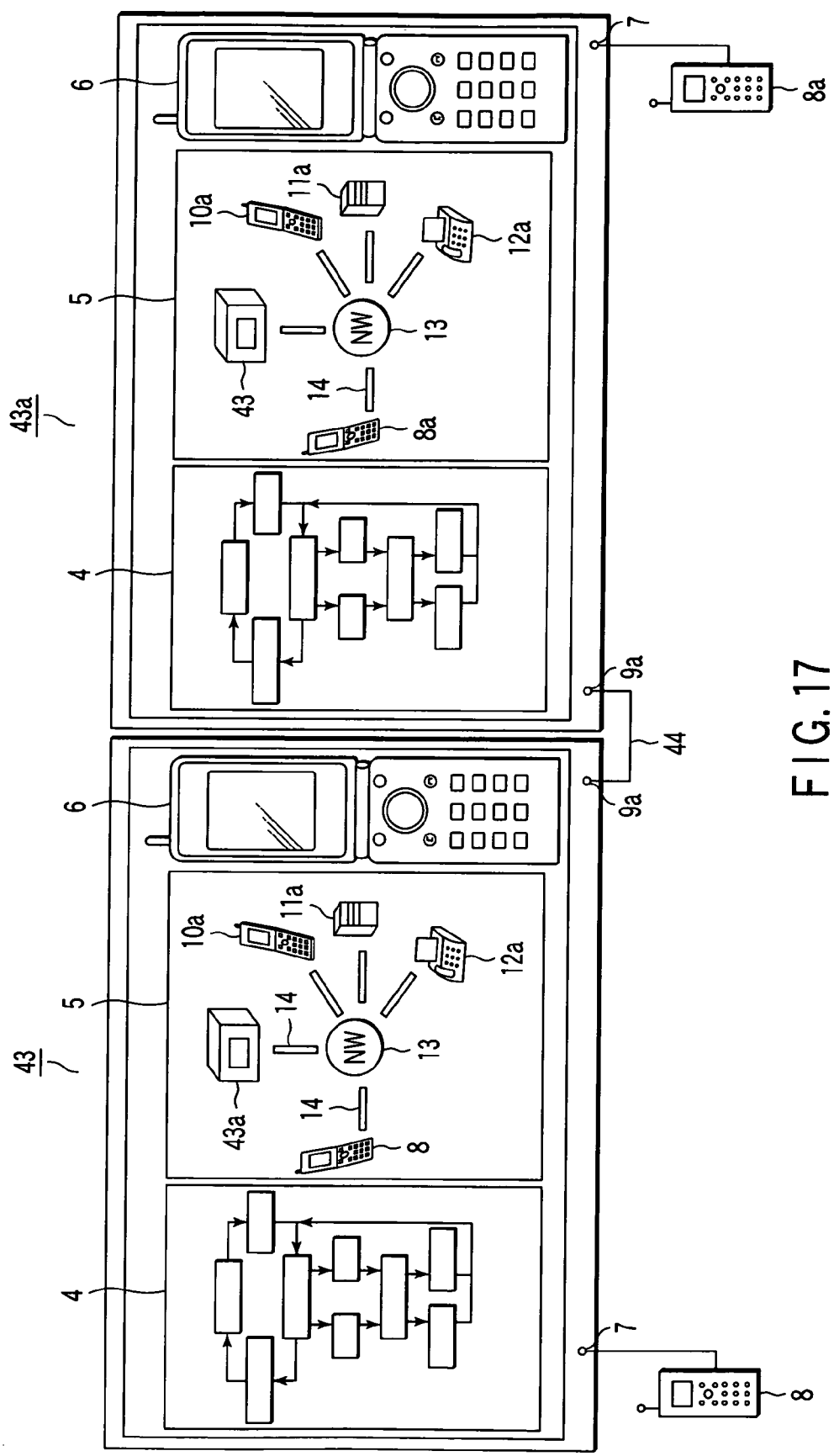
FIG. 17 is a view showing display contents of a display device in the mobile network simulator apparatus shown in FIG. 16.

The display device 2 of each of the mobile network simulator sections 43, 43a displays the sequence display section 4, the connection state display section 5, and the connection destination display section 6, respectively, as shown in FIG. 17.

From among them, each connection state display section 5 displays a connection state composed of the remote mobile network simulator 43a (43) in addition to the test terminal 8 (8a), the mobile network simulator section 13, the virtual call destination 10a, the virtual server 11a, the virtual TV telephone (Video call terminal) 12a, and a plurality of connection lines 14.

FIG. 18 is a block diagram depicting a schematic configuration of one mobile network simulator apparatus 43 according to the third embodiment.

In FIG. 18, similar constituent elements to those of the mobile network simulator apparatus 43 according to the first embodiment shown in FIG. 4 described previously are designated by like reference numerals, and a duplicate detailed description is omitted here.

In one mobile network simulator apparatus 43 according to the third embodiment, the communication control section 20 of the mobile network simulator section 13 (refer to FIG. 5) is connected by the signal cable 44 to the signal terminal 9a of the remote mobile network simulator apparatus 43 via the signal terminal 9a in addition to each of the signal terminals 9b, 9c, 9d connected via the signal converter section 45 for converting a signal as an interface among the virtual call destination 10a, the virtual server 11a, the virtual TV telephone (Video call terminal) 12a, and a device serving as a connection destination.

Now, with reference to FIGS. 19 to 22, a description will be given with respect to operations for the personnel who executes testing to carry out comparative tests of two test terminals 8, 8a by using a set of two mobile network simulator apparatuses 43, 43a according to the third embodiment configured as described above and a change of a display state of the display device 2 of each of the mobile network simulators 43, 43a.

First, as described previously, after each of the test terminals 8, 8a has been connected to the signal terminal 7 of each of the mobile network simulators 43, 43a, the personnel who executes testing starts up each of the mobile network simulator apparatuses 43, 43a and turns ON the power supply of each of the test terminals 8, 8a.

Figure 19:
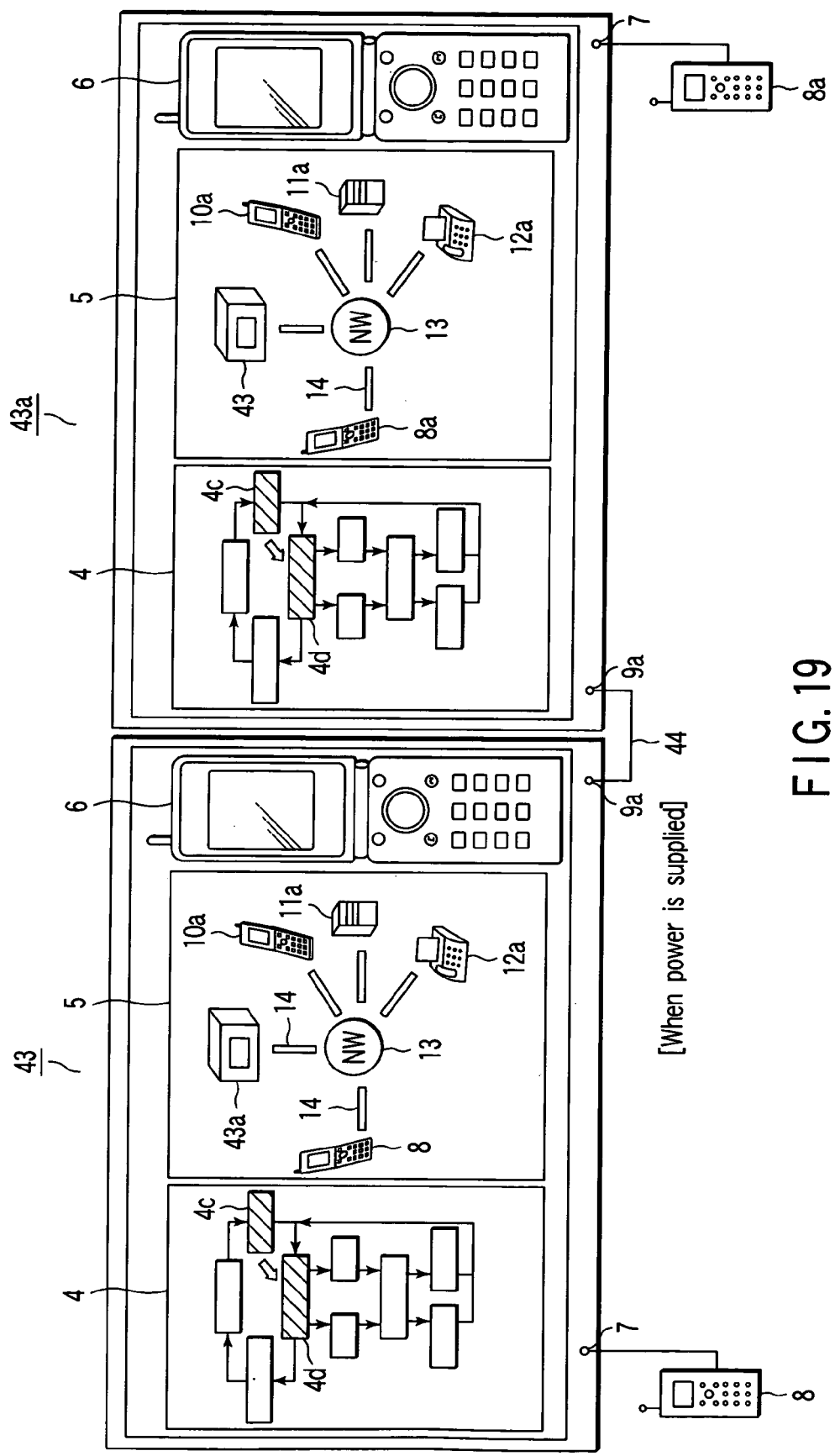
FIG. 19 is a view showing a connection relationship with a sequence displayed on the display device when a comparative test is carried out by using the mobile network simulator apparatus shown in FIG. 16.

In this manner, in the sequence display section 4 of each of the mobile network simulator apparatuses 43, 43a, the "position registration" sequence 4c is turned ON for a short time, and then, the "standby state" sequence 4d is turned ON, as shown in FIG. 19.

In this state, the personnel who executes testing makes a dialing operation for the test terminal 8 at the side of one mobile network simulator apparatus 43 to specify the remote test terminal 8a. In this case, at the side of the mobile network simulator apparatus 43, the "call origination" sequence 4e in the sequence display section 4 is turned ON, and at the same time, the connection line 14 blinks between the test terminal 8 of and the mobile network simulator section 13 in the connection state display section 5, as shown in FIG. 20.

At the side of the other mobile network simulator apparatus 43a, the "call termination" sequence 4f in the sequence display section 4 is turned ON, and at the same time, the connection line 14 blinks between the mobile network simulator section (NW) 13 and one mobile network simulator 43 in the connection state display section 5.

Then, a call termination tone sounds in the other test terminal 8a.

At this time, in the side of call origination of the mobile network simulator 43, connection line 14 between the mobile network simulator section 13 and the mobile network simulator 43a may be blinked.

Also, in the order side of the mobile network simulator 43a, the connection line 14 between the mobile network simulator section 13 and the mobile network simulator 43a may be blinked.

When the personnel who executes testing makes an off-hook operation at the other test terminal 8a, a communication line is formed relevant to the other test terminal 8a via the mobile network simulator section (NW) 13 at the side of one mobile network simulator 43 and the mobile network simulator section (NW) 13 at the side of the other mobile network simulator apparatus 43.

Figure 21:
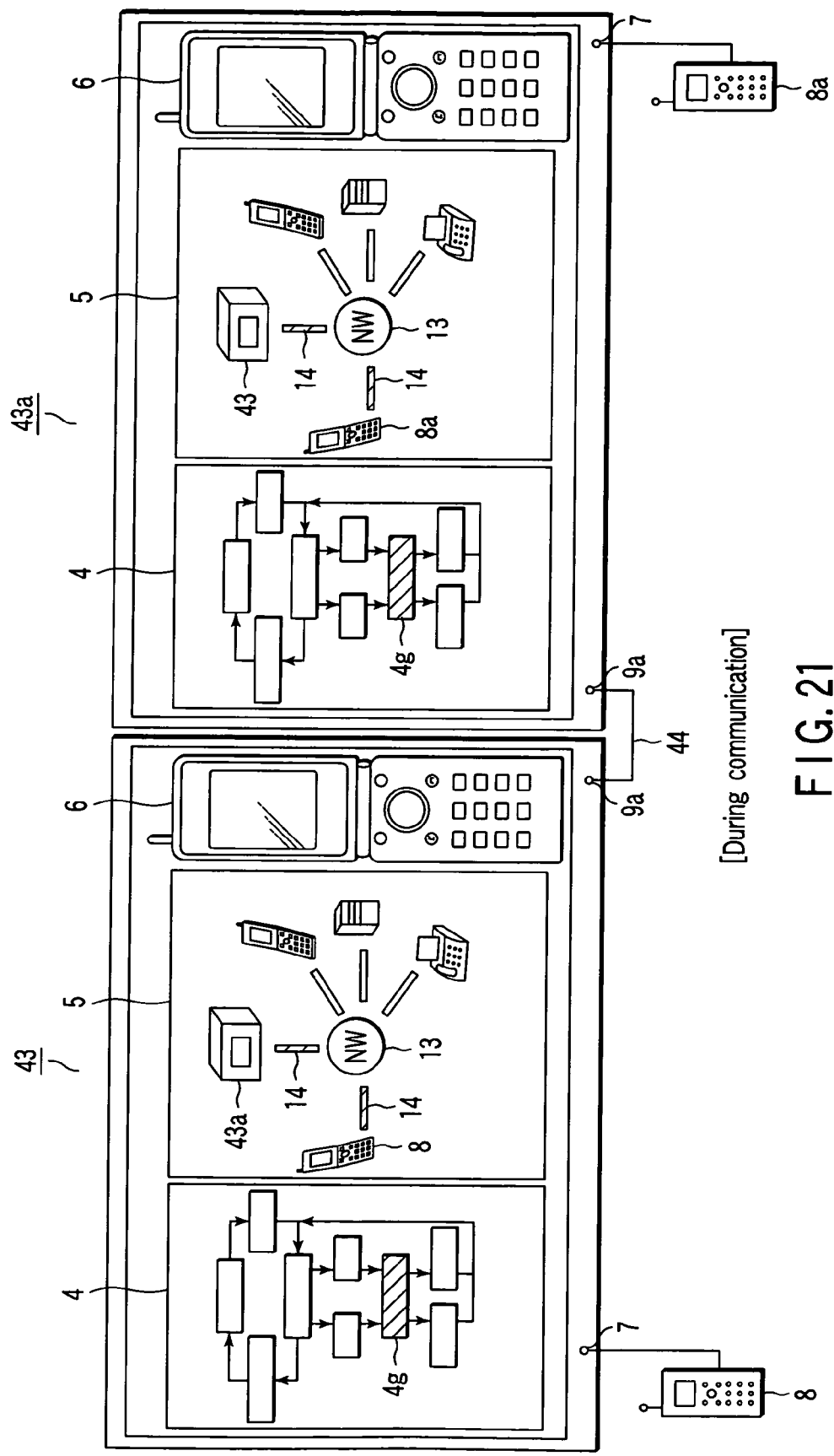
FIG. 21 is a view showing a connection relationship with a sequence displayed on the display device when a comparative test is carried out by using the mobile network simulator apparatus shown in FIG. 16.

As a result, at the side of one mobile network simulator 43, the "communication state" sequence 4g in the sequence display section 4 is turned ON, and at the same time, the connection line 14 is turned ON between the test terminal 8 and the mobile network simulator section (NW) 13 in the connection state display section 5 and the connection line 14 is turned ON between the mobile network simulator section (NW) 13 and the other mobile network simulator apparatus 43a, as shown in FIG. 21.

At the side of the other mobile network simulator apparatus 43a, the "communication state" sequence 4g in the sequence display section 4 is turned ON, and at the same time, the connection line 14 is turned ON between the test terminal 8a and the mobile network simulator section (NW) 13 in the connection state display section 5, and the connection line 14 is turned ON between the mobile network simulator section (NW) 13 and one mobile network simulator apparatus 43.

Then, when a series of check works such as a communication quality, a call quality, and a provided service execution state is terminated between the test terminals 8, 8a in a state in which the communication line has been formed via the two mobile network simulator apparatuses 43, 4a, the personnel who executes testing makes an on-hook operation for the test terminal 8 to disconnect the connection line.

Figure 22:
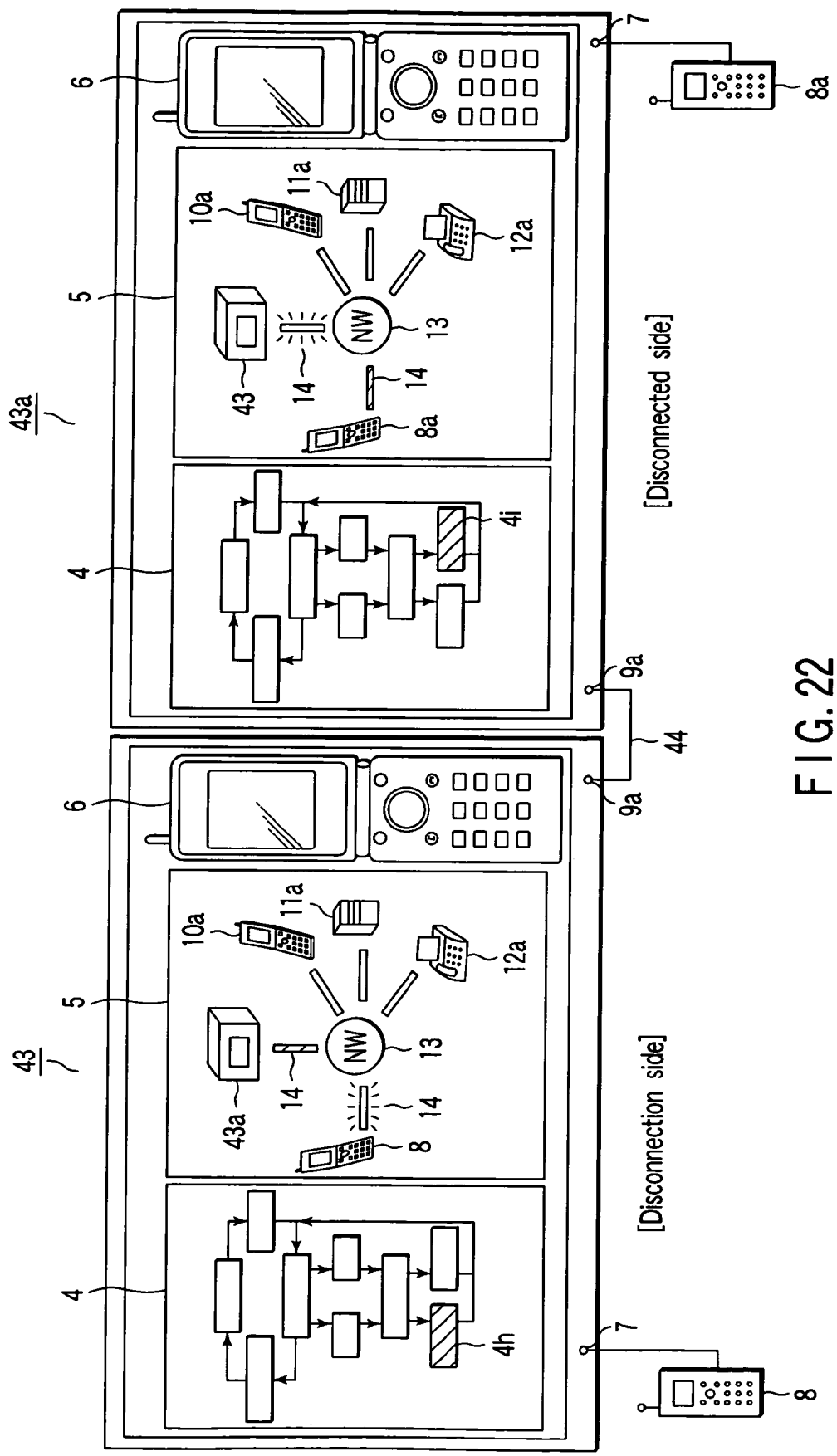
FIG. 22 is a view showing a connection relationship with a sequence displayed on the display device when a comparative test is carried out by using the mobile network simulator apparatus shown in FIG. 16.

Then, at the side of one mobile network simulator apparatus 43, the "UE disconnection" sequence 4h in the sequence display section 4 is turned ON, and at the same time, the connection line 14 blinks between the test terminal 8 and the mobile network simulator section (NW) 13 in the connection state display section 5, as shown in FIG. 22.

At the side of the other mobile network simulator apparatus 43a, the "NW disconnection" sequence 4i in the sequence display section 4 is turned ON, and at the same time, the connection line 14 blinks between the mobile network simulator section (NW) 13 and one mobile network simulator in the connection state display section 5.

When the communication line between the test terminals 8a, 8a is completely disconnected, the "standby state" sequences 4d, 4d are turned ON in each of the sequence display sections 4, 4 of the two mobile network simulator apparatuses 43, 43a. Then, the connection line 14 is turned OFF between the test terminal 8, 8a and the mobile network simulator section (NW) 13 in each of the connection state display sections 5, 5 and the connection line 14 is turned OFF between the mobile network simulator section (NW) 13 and each of the mobile network simulators 43, 43a.

The display mode of the connection line 14 described so far is provided as an example. If a connection progress can be identified, the display mode may be displayed by changing the sequence of turning ON/OFF the power, a blinking method, a color, and brightness.

In the thus configured third embodiment, the personnel who executes testing can easily carry out comparative tests of two test terminals 8, 8a by using one set of two mobile network simulator apparatuses 43, 43a. In addition, it becomes possible to distinguishably check the detailed sequence and detailed connection state of each of the test terminals 8, 8a at the stage of executing the comparative tests based on the display caused by each of the sequence display sections 4, 4 and each of the connection state display sections 5, 5.

While the foregoing description has been given with respect to connections in one set of two mobile network simulator apparatuses 43, 43a having the same configuration, a distributor (for example, a hub in the case of the Ethernet (registered trademark) connection) is used in the middle of the signal cable 44, thereby making it possible to connect two or more mobile network simulator apparatuses 43, 43a, . . . each of which has the same configuration.

In this case also, the personnel who executes testing can make a dialing operation for the test terminals 8, 8a or the like to determine a connection destination.

Moreover, it becomes possible to test a call with a third person to enable a call at the same time with three or more test terminals 8, 8a, . . . by connecting three or more mobile network simulator apparatuses 43, 43a, . . . each of which has the same configuration.

Fourth Embodiment

Figure 23:
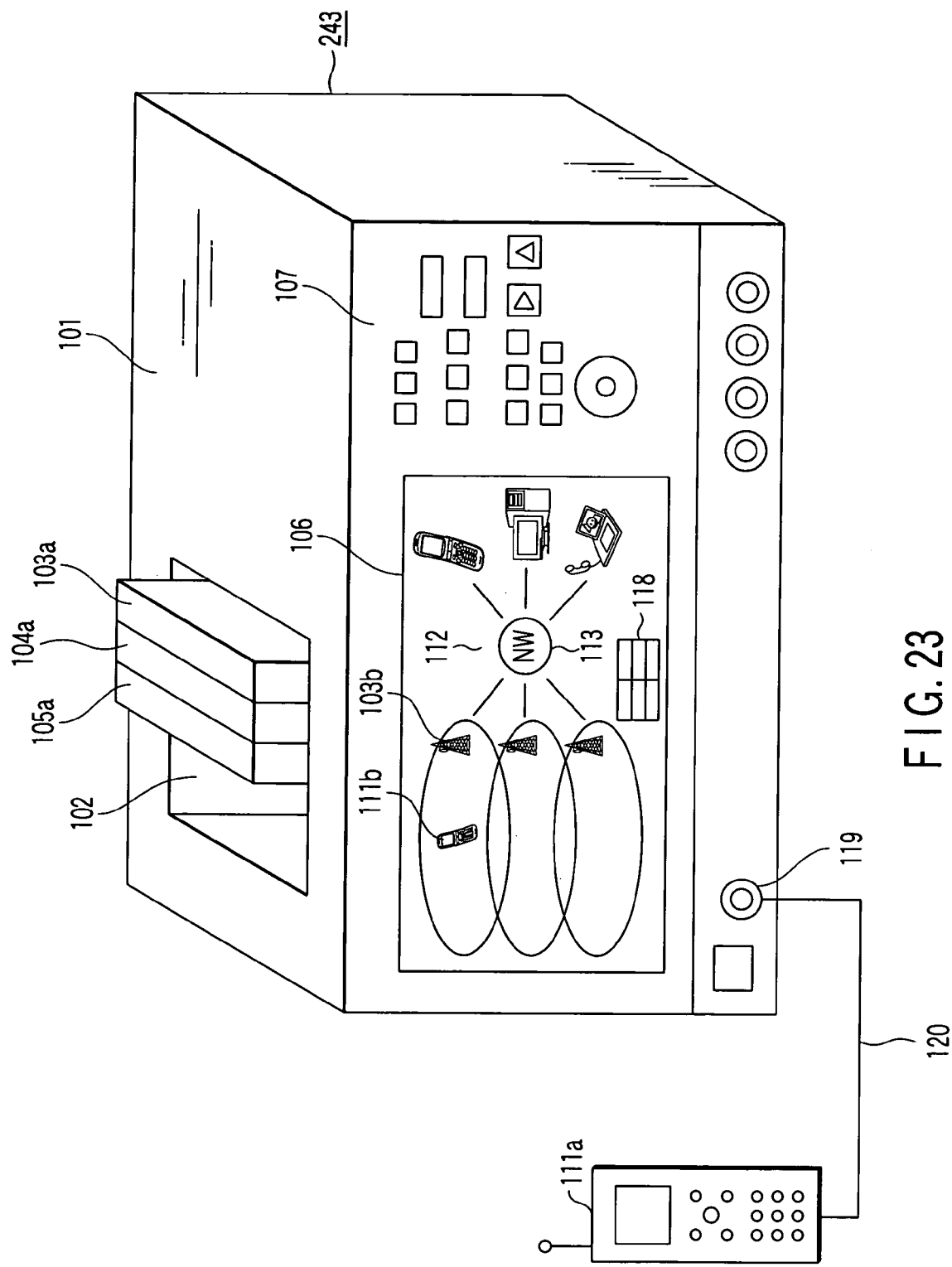
FIG. 23 is an external view showing a mobile network simulator apparatus according to a fourth embodiment of the present invention.

FIG. 23 is an external view showing a mobile network simulator apparatus 243 according to a fourth embodiment of the present invention.

In the mobile network simulator apparatus 243 according to the fourth embodiment, there is provided further specifically described contents of an example in which the mobile network simulator section 121 has functions of a plurality of mobile network simulators; and in the mobile network simulator apparatus 43 according to the first embodiment described previously, the test terminal 8 displayed on the connection state display section 5 of the display device 2 described with reference to FIG. 12 is moved to change the distance D on the display screen between the test terminal 8 and the mobile network simulator section (NW) 13.

Thus, as a display device for use in the mobile network simulator apparatus 243 according to the fourth embodiment, there is provided a display device 106 having a connection state display section 112 or the like which corresponds to the connection state display section 5 of the display device 2 by eliminating the constitution which corresponds to the sequence display section 4 and the connection destination display section 6 of the display device 2 in the first embodiment.

That is, in the mobile network simulator apparatus 243 according to the fourth embodiment, a mobile mount section 102 is formed on a top face of a cabinet 101, as shown in FIG. 23.

A plurality of mobile network simulator mobiles 103, 104*a*, 105*a* are removably provided at the mobile mount section 102.

The display device 106 and an operating panel 107 are provided on the front face of the cabinet 101.

As shown in FIG. 24, the display device 106 graphically or schematically displays: three mobile network simulators (display sections) 103*b*, 104*b*, 105*b*; three pseudo areas (display sections) 108, 109, 110 provided for these mobile network simulators (display sections) 103*b*, 104*b*, 105*b*; a test terminal (display section) 111*b* serving as a mobile terminal; a connection state display section 112; a transmission power display section 118; and a distance display section 140 which displays a distance between each of the mobile network simulators (display sections) 103*b*, 104*b*, 105*b* and the test terminal (display section) 111*b*.

Each of the pseudo areas 108, 109, 110 corresponds to an actual communication area possessed by each of the mobile network simulators 103*b*, 104*b*, 105*b* which are communicable with the test terminal 111*a* (111*b*).

The connection state display section 112 can display a state in which the actual test terminal 111*a* shown in FIG. 23 (corresponding to the test terminal 111*b* on the display screen of FIG. 24) is connected to the mobile network simulators 103*b*, 104*b*, 105*b* displayed as graphically produced icons, respectively, a network 113, and a virtual call destination 114, a virtual server 115, and a virtual TV telephone (Video call terminal) 116 etc., for example, serving as connection destinations via a connection line 117.

Specifically, the virtual call destination 114, the virtual server 115, and the virtual TV telephone (Video call terminal) 116 actually connected to the test terminal 111*b*, and the connection line 117 existing in a communication path reaching them are displayed to blink and to be turned ON.

The transmission power display section 118 graphically displayed can display a set value of transmission power (output level) of a transmission signal which actual mobile network simulators 103*c* (103*b*), 104*c* (4*b*), 105*c* (105*b*) actually transmit to the actual test terminal 111*a* (11*b*).

In FIG. 24, the test terminal 111*a* (11*b*) is positioned in the pseudo area 108 of the mobile network simulator 103*c* (103*b*) at the transmission power display section 118. Thus, the set value of only the transmission power (output level) of the mobile network simulator 103*c* (103*b*) is displayed, and the transmission power (output level) of other mobile network simulators 104*c* (104*b*), 105*c* (105*b*) is not displayed as an output stop state (for example, a state in which the value of transmission power is deleted).

There is a case in which this mobile network simulator apparatus 143 cannot carry out display of the output stop state completely in the transmission power display section 118. Thus, the similar state can be achieved in a pseudo manner by providing the setting to be equal to larger than the receiving capability of the test terminal 111*a* or outputting a signal of such a type which the test terminal 111*a* cannot be recognized as a received signal in the output stop state of the transmission power.

The distance display section 140 displays a value (following also says "actual distance") corresponding to an actual distance between each of the mobile network simulators 103*c* (103*b*), 104*c* (104*b*), 105*c* (105*b*) and the actual test terminal 111*a* (111*b*) set by the personnel who executes testing.

In FIG. 24, the test terminal 111*a* (111*b*) is positioned in the pseudo area 8 of the mobile network simulator 3*b*. Thus, in the distance display section 140, a value of only the distance between the test terminal 111*a* (11*b*) and the mobile network simulator 103*c* (103*b*) is provided, and the distance relevant to other mobile network simulators 104*c* (104*b*), 105*c* (105*b*) is provided as a display stop state (such as a state in which a value is deleted).

The distance display section 140 displays an actual distance relevant to the actual test terminal 111*a* (111*b*) in the vicinity of each of the mobile network simulators 103*b*, 104*b*, 105*b* displayed on the display device 106, thus making it possible for the personnel who executes testing to visually grasp what distance corresponds to the distance on the display screen in an actual environment. Thus, operability of the mobile network simulator apparatus 143 is improved.

In FIG. 23, there is provided a signal terminal 119 to which the test terminal 111*a* serving as an actual mobile terminal (corresponding to the test terminal 111*b* on the display screen of FIG. 24) is connected via a signal line 120 on, for example, the front face of the cabinet 101.

Figure 25:
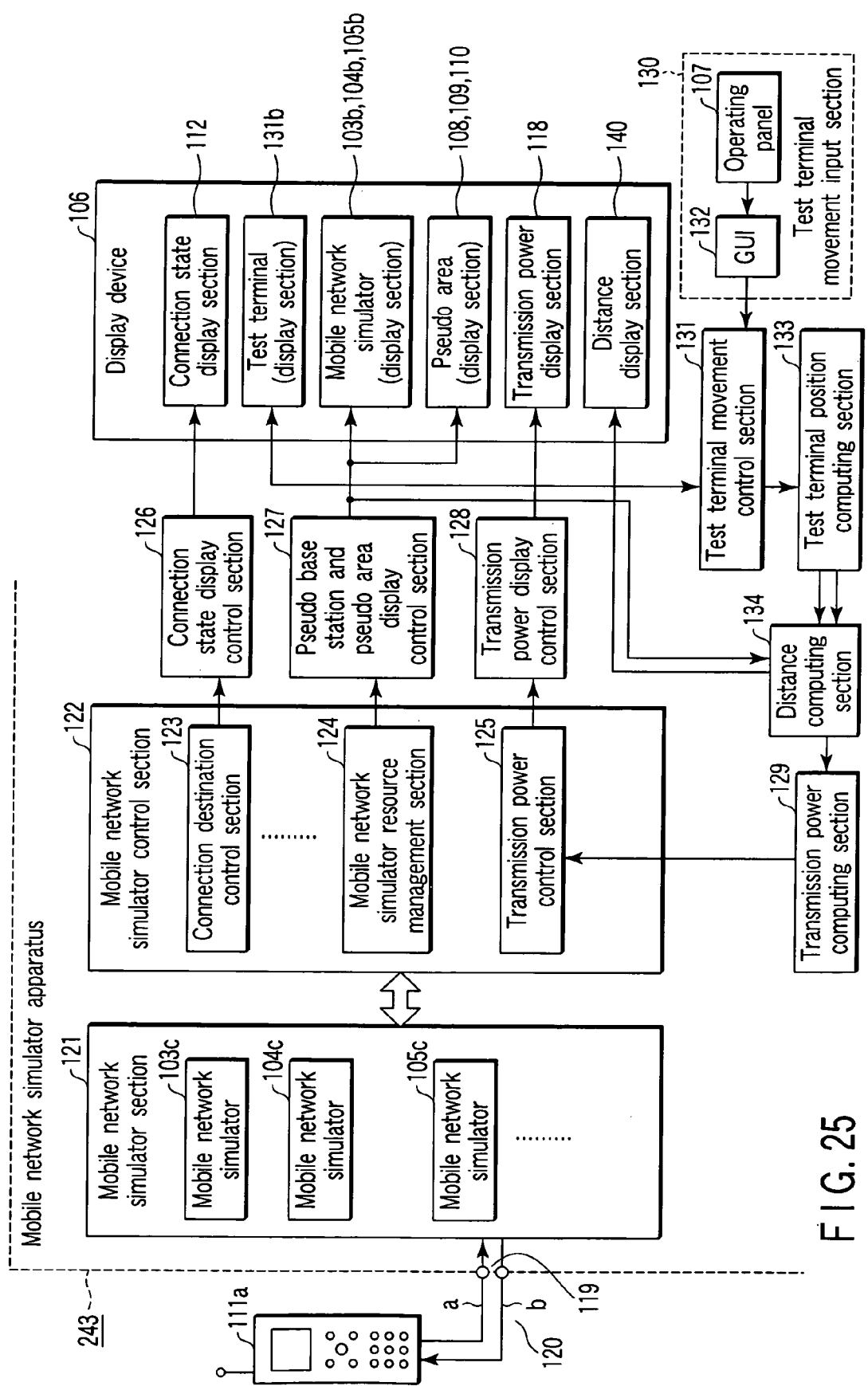
FIG. 25 is a block diagram depicting a schematic configuration of the mobile network simulator apparatus shown in FIG. 23.

FIG. 25 is a block diagram depicting a schematic configuration of the mobile network simulator apparatus 243 according to the fourth embodiment.

A signal "a" from the test terminal 111*a* is inputted in parallel to each of the three mobile network simulators 103*c*, 104*c*, 105*c* composed of, for example, a computer which configure the mobile network simulator section 121 via the signal line 120.

Each of the mobile network simulators 103*c*, 104*c*, 105*c* is incorporated in each of the mobile network simulator modules 103*a*, 104*a*, 105*a* shown in FIG. 23 and corresponds to each of the mobile network simulators 103*b*, 104*b*, 105*b* displayed on the display screen of FIG. 24.

A signal "b" from each of the mobile network simulators 103*c*, 104*c*, 105*c* is delivered to the test terminal 111*a* via the signal line 120.

Each of the mobile network simulators 103*c*, 104*c*, 105*c* has the corresponding functions similar to those of an actual base station in response to the test terminal 11*a*, and forms a communication line between the test terminal 111*a* and each of the virtual call destination 114, the virtual server 115, and the virtual TV telephone (Video call terminal) 116 which are virtual connection destinations in response to a connection request having specified a communication destination from the test terminal 111*a*.

A mobile network simulator control section 122 has a function for individually managing and controlling a state and an operation of each of the mobile network simulators 103*c*, 104*c*, 105*c* incorporated in the mobile network simulator 121.

A communication destination control section 123, a mobile network simulator resource management section 124, a transmission power control section 125 and the like are provided in the mobile network simulator control section 122.

The communication destination control section 123 recognizes and edits a connection state relevant to the virtual call destination 114, the virtual server 115, and the virtual TV telephone (Video call terminal) 116 actually connected to the test terminal 111*b* specified by each of the mobile network simulators 103*c*, 104*c*, 105*c*, and delivers the connection state to a connection state display control section 126.

The connection state display control section 126 outputs the connection state inputted from the communication destination control section 123 to be displayed on the connection state display section 112 of the display device 106, as shown in FIG. 24.

The mobile network simulator resource management section 124 stores the position of each of the mobile network simulators 103c, 104c, 105c incorporated in the mobile network simulator section 121 and the position and size (wideness) of each of the pseudo areas 108, 109, 110 of the mobile network simulators 103c, 104c, 105c incorporated in the mobile network simulator section 121, and delivers these items of position information to a mobile network simulator and pseudo area display control section 127.

The mobile network simulator and pseudo area display control section 27 displays the mobile network simulators 103b, 104b, 105b and the pseudo areas 108, 109, 110, which correspond to the mobile network simulators 103c, 104c, 105c, respectively, at positions specified on the display screen of the display device 106, as shown in FIG. 24.

Figure 28A:
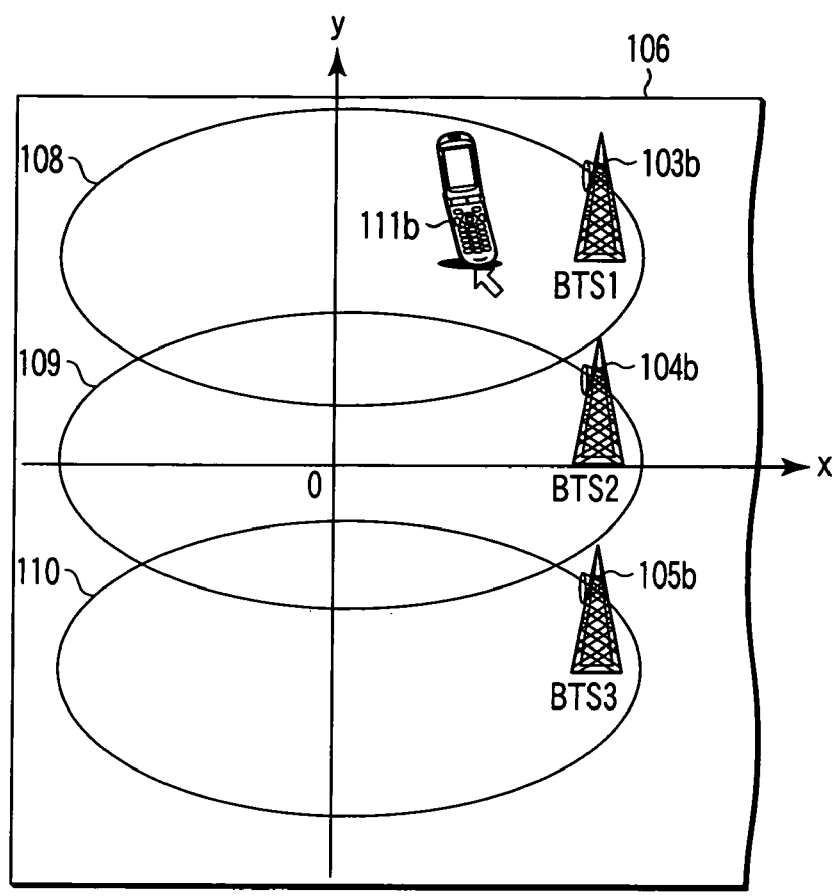
FIGS. 28A and 28B are views each showing an xy coordinate formed on the display device incorporated in the mobile network simulator apparatus shown in FIG. 23.

Specifically, as shown in FIG. 28A, a quadrature coordinate (xy coordinate) consisting of an x coordinate and a y coordinate is formed (displayed or not displayed) on the display screen of the display device 106, as shown in FIG. 28A. The position of each of the mobile network simulators 103b, 104b, 105b and the position of each of the pseudo areas 108, 109, 110 are indicated on the coordinate (X, Y) on this xy coordinate.

The x-coordinate axis corresponds to a first coordinate axis and the y-coordinate axis corresponds to a second coordinate axis.

Figure 28B:
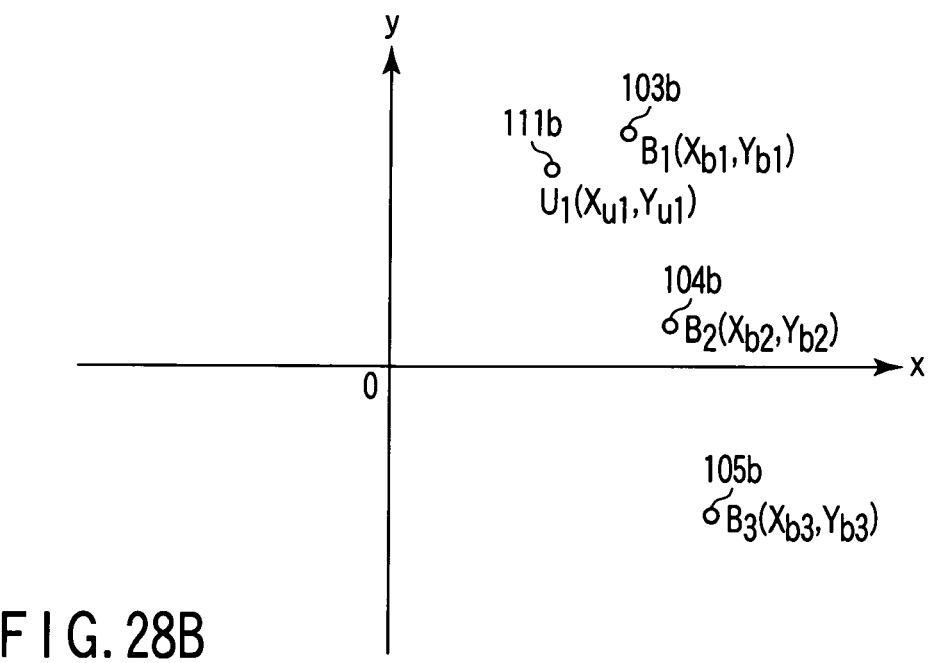

The mobile network simulator and pseudo area display control section 127, as shown in FIG. 28B, delivers to a distance computing section 134 each of coordinates B1 $(X_{b1}, Y_{b1})$, B2 $(X_{b2}, Y_{b2})$, B3 $(X_{b3}, Y_{b3})$ which indicate the positions of the mobile network simulators 103b, 104b, 105b on the xy coordinate of the display device 106.

Thus, the mobile network simulator resource management section 124 and the mobile network simulator and pseudo area display control section 127 have functions of storing the positions of the mobile network simulators 103c, 104c, 105c incorporated in the mobile network simulator section 121 and the positions of the pseudo areas 108, 109, 110 and of outputting the mobile network simulators 103b, 104b, 105b and the pseudo areas 108, 109, 110 to be displayed on the display device 106.

Figure 26B:
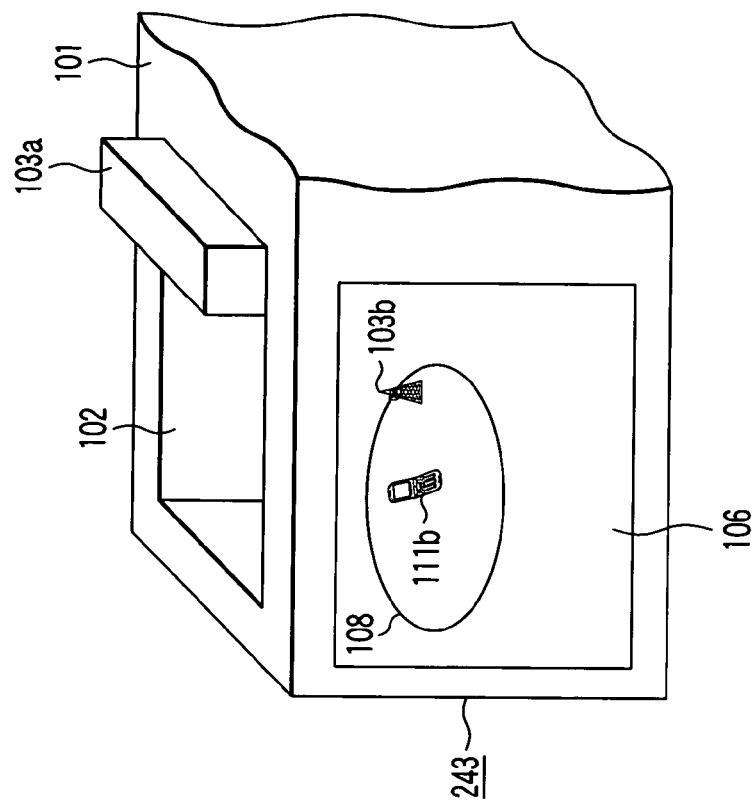
FIGS. 26A and 26B are views each showing a relationship between a mount state of a mobile network simulator module for use in the mobile network simulator apparatus shown in FIG. 23 and the display contents of the display device.
Figure 26A:
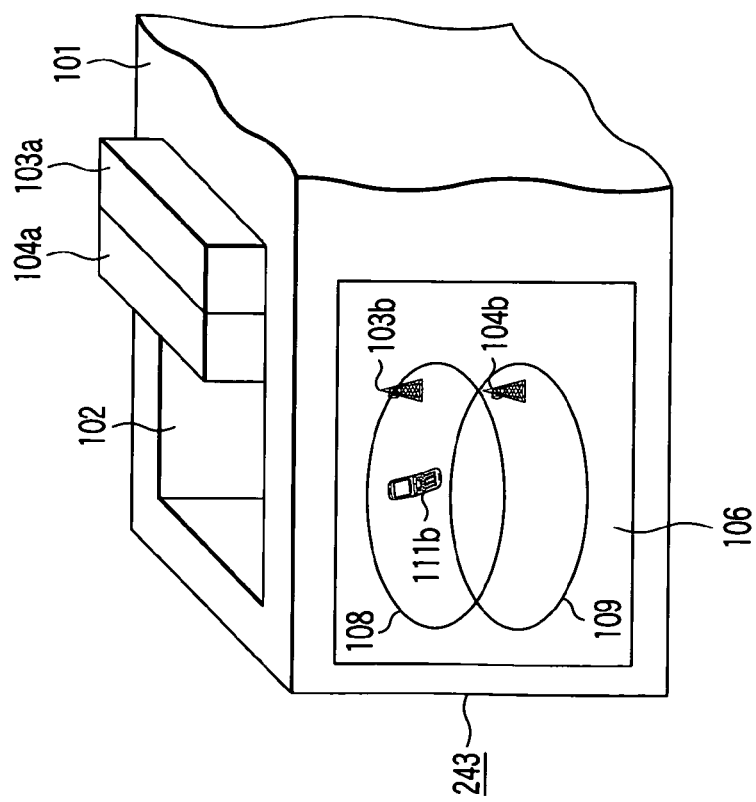

In this manner, for example, in the case where only two mobile network simulators 103a, 104a are mounted on the mobile mount section 102 on the top face of the cabinet 101 as shown in FIG. 26A, the display device 106 displays only the mobile network simulators 103b, 104b and the pseudo areas 108, 109 which correspond to the mobile network simulator modules 103a, 104a.

Further, when one mobile simulator module 104a is sampled in the state shown in FIG. 26A, and the shown state is moved to a state shown in FIG. 26B, the mobile network simulator 104b and the pseudo area 109 displayed on the display device 106 are eliminated, and the mobile network simulator 103b and the pseudo area 108 remain.

It is possible to display the mobile network simulator 104b and the pseudo area 109 in a display mode indicating invalidation of a dashed line or the like instead of deleting the mobile network simulator 104b and the pseudo area 109.

The transmission power control section 125 shown in FIG. 25 sets to each of the mobile network simulators 103c, 104c, 105c the transmission power (output level) of the signal "b" transmitted to the test terminal 111a by each of the mobile network simulators 103c, 104c, 105c.

Further, the transmission power control section 125 delivers transmission powers (output levels) set at the mobile network simulators 103c, 104c, 105c to a transmission power display control section 128.

The transmission power display control section 128 displays on the transmission power display section 118 of the display device 106 the transmission power (output level) for each of the mobile network simulators 103c, 104c, 105c received from the transmission power control section 125, as shown in FIG. 24.

Now, a description will be given with respect to a configuration and an operation of a test terminal movement input section 130 and a test terminal movement control section 131 shown in FIG. 25.

The test terminal movement input section 130 and the test terminal movement control section 131 each change a distance on the display screen between the test terminal 111b and each of the mobile network simulators 103c (104c, 105c) displayed on the display device 106.

The positions of the mobile network simulators 103b (104b, 105b) are fixed in principle, and thus, the coordinate (X, Y) on the xy coordinate of the test terminal 111b on the display screen of the display device 106 is changed.

In the present embodiment, by using a GUI 132, the test terminal 111b is moved in response to an operation on the operating panel 107 by the personnel who executes testing, and the coordinate (X, Y) on the xy coordinate is changed.

Figure 27A:
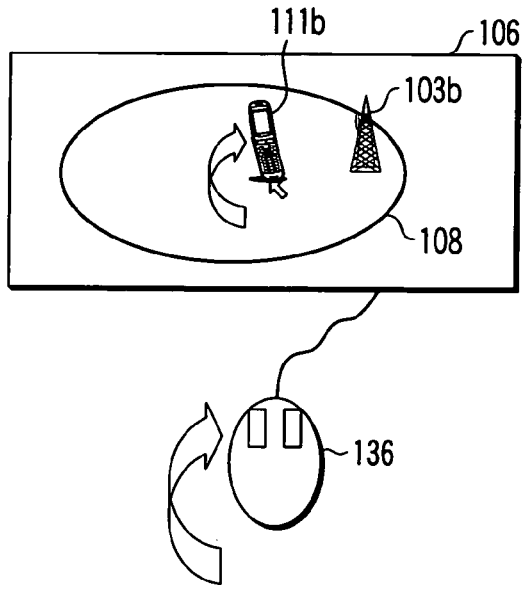

In one technique of changing the coordinate (X, Y) on the xy coordinate of the test terminal 111b on the display screen of the display device 106, in addition to use of the operating panel 107 described above, the test terminal 111b graphically displayed on the display device 106 is regarded as an icon, thereby making it possible to move (drag) the icon of the test terminal 111b by a mouse 136 as shown in FIG. 27A.

Figure 27B:
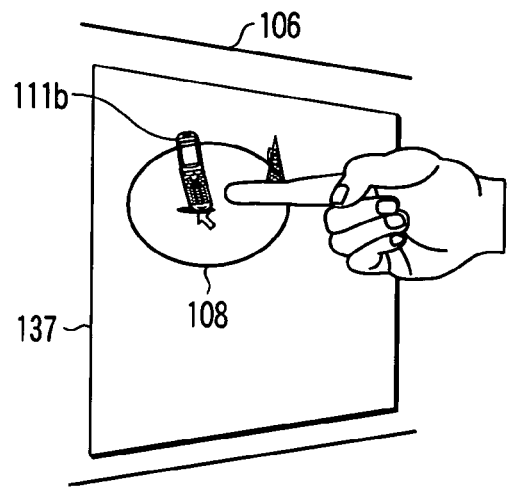

In addition, in another technique, a touch panel 137 is provided on a surface of the display device 106, thereby making it possible for the personnel who executes testing to move the position of the test terminal 111b on the touch panel 137 with finger, as shown in FIG. 27B.

Figure 27C:
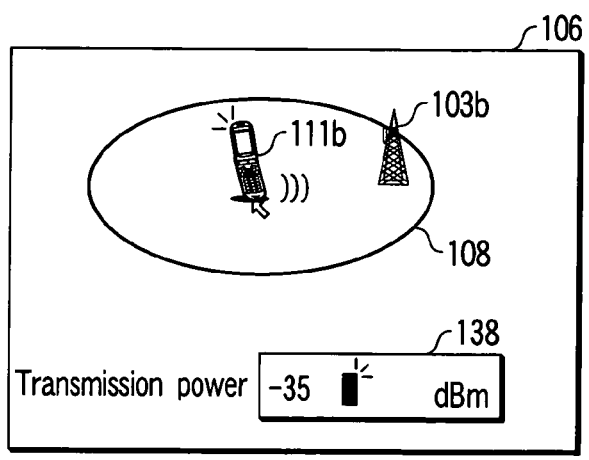

Further, in still another technique as shown in FIG. 27C, an input frame 138 of the transmission power is displayed on the display device 106, and the personnel who executes testing input a value of the transmission power (output level) of each of the mobile network simulators 103b (104b, 105b) relevant to the test terminal 111b from the operating panel 107 into the input frame 138, thereby making it possible to move the position of the test terminal 111b such that the distance between each of the mobile network simulators 103b (104b, 105b) and the test terminal 111b is obtained as a distance corresponding to the inputted transmission power (output level).

In FIGS. 27A, 27B and 27C, although all operations on the same screen have been described, it is possible to move the position of the test terminal 111b by using an additional dedicate input screen, as shown in FIG. 27D.

That is, in FIG. 27D, the position of a knob 142 is moved by the mouse along the scale of a distance displayed on the screen. Accordingly, when the position of the test terminal 111b is moved, the actual distance and transmission power displayed in display frames 144, 145 change according to that movement.

In this way, by employing an additional dedicated distance input screen, operation can be carried out even in the case where a display region is small in number on one screen, and the movement range of the test terminal 111b is limited.

As shown in FIG. 24, a zoom button 143 is provided in each of the pseudo areas 108, 109, 110, and the zoom button 143 is clicked by a mouse, thereby making it possible to display the distance input screen in an enlarged manner on the dedicated distance input screen, as shown in FIG. 27E.

In the case of FIG. 27E as well, the position of a knob 142 is moved by the mouse along the scale of a distance displayed on the screen, whereby, when the position of the test terminal 111b is moved, the actual distance and transmission power displayed in the display frames 144, 145 change according to that movement.

In this manner, when a distance (resulting transmission power) of a receiving enable level limit of the test terminal 111a (111b) is provided, an input operation can be easily carried out in the case where an attempt is made to slightly move the test terminal 111b.

Even on the same screen shown in FIGS. 27A, 27B, and 27C, the zoom button 143 shown in FIG. 24 is clicked by the mouse, thereby making it possible to carry out a display in an enlarged manner and making it easy to input fine movement.

Further, as shown in FIG. 27F, an actual distance input frame 141 has been displayed on the display device 106, and the personnel who executes testing input the actual distance to be set between each of the mobile network simulators 103b (104b, 105b) and the test terminal 111a from the operating panel 107 into the input frame 141. In this case, the distance on the display between the each of the mobile network simulators (103b) (104b, 105b) and the test terminal 111b is changed to a value which corresponds to the inputted actual distance, thereby making it possible to move the position of the test terminal 111b.

That is, in the case where the distance between the mobile terminal and the base station is known in actual environment based testing, it is better to move the test terminal 111b by numerically inputting the actual distance to the input frame 141 rather than to move the test terminal 111b on the display screen to adjust to a desired distance.

In this case, in principle, the inputted actual distance is replaced with the movement distance in one coordinate axis direction (for example, x coordinate) in the xy coordinate described previously.

In the case where the actual distances relevant to the two mobile network simulators 103b, 104b are inputted individually, the distances individually inputted to the two mobile network simulators 103b, 104b are converted into direct distances, and a cross point between these two straight lines is defined as a position of the test terminal 111b.

In this case, however, in the case where the cross point of the two straight lines cannot be obtained, it is handled as an error, and the test terminal 111b is not moved.

A test terminal position computing section 133 reads a coordinate $U_1$ $(X_{u1}, Y_{u1})$ which indicates a position of the test terminal 111b on the xy coordinate of the display device 106, and delivers the read coordinate to the distance computing section 134, as shown in FIGS. 28A and 28B, via the test terminal movement control section 131.

The distance computing section 134 computes a distance between the test terminal 111b and one or more mobile network simulators 103b, 104b, 104b, 105b from the coordinates $B_1$ $(X_{b1}, Y_{b1})$, $B_2$ $(X_{b2}, Y_{b2})$, $B_3$ $(X_{b3}, Y_{b3})$ of the mobile network simulators 103c, 104b, 105b and the coordinate $U_1$ $(X_{U1}, Y_{u1})$ of the test terminal 111b and delivers the computed distance to a transmission power computing section 129.

In addition, the distance computing section 134 computes each actual distance between each of the mobile network simulators 103c, 104c, 105c and the actual test terminal 111a from each computed distance on the display screen and outputs the computed distance in order to display it on the distance display section 140 of the display device 106.

The transmission power computing section 129 computes each transmission power (output level) of the signal "b" transmitted from each of the mobile network simulators 103c, 104c, 105c to the test terminal 111a by using a distance between the test terminal and one or more inputted mobile network simulators 103b, 104b, 105c, and delivers the computed power (output level) to the transmission power control section 125.

In general, as the distance relevant to the test terminal 111a is shorter, the transmission power (output level) of a signal transmitted to the test terminal 111a is increased.

Now, specific operations of the distance computing section 134 and the transmission power computing section 129 will be described with reference to FIGS. 29 to 33.

Figure 29A:
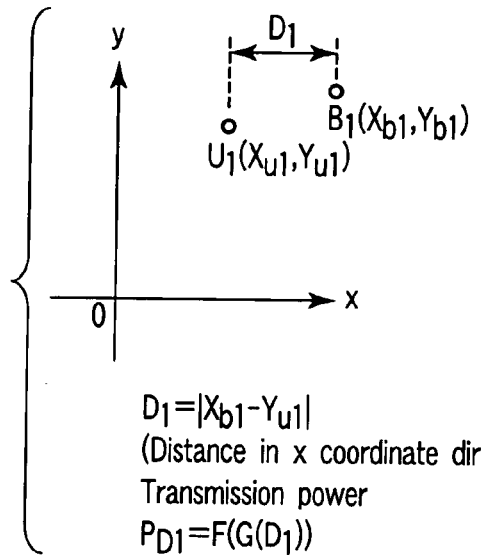
FIGS. 29A and 29B are views each showing procedures for computing a distance and transmission power between a mobile network simulator section and a test terminal in the mobile network simulator apparatus shown in FIG. 23.
Figure 29B:
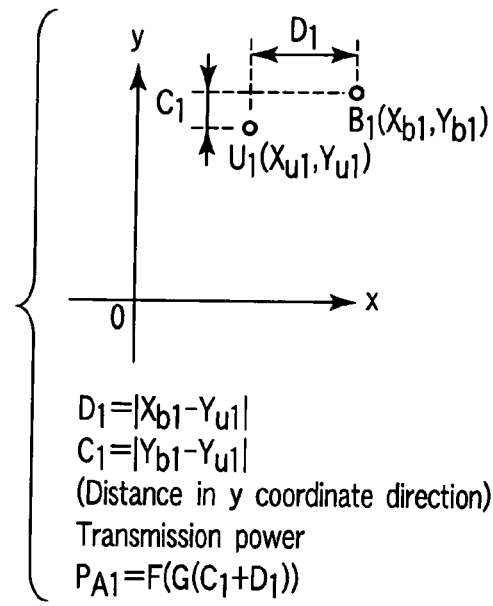

In the present embodiment, in definition of a distance between the test terminal 111b (coordinate $U_1$ $(X_{u1}, Y_{u1})$) and the mobile network simulator 103b (104b, 105b) (coordinate $B_1$ $(X_{b1}, Y_{b1})$), there are three types of distances, i.e., a distance $D_1$ in the x coordinate direction shown in FIG. 29A; a distance $(C_1+D_1)$ obtained by adding a distance $C_1$ in the y coordinate direction and a distance $D_1$ in the x coordinate direction shown in FIG. 29B; and a direct distance $E_1$ shown in FIG. 3. The personnel who executes testing sets in advance at the distance computing section 134 which type of distance is employed from among the distances $D_1$, $(C_1+D_1)$, and $E_1$.

For example, in the case where the test terminal 111b and one mobile network simulator 103b exist as shown in FIG. 26B, there is no need for movement in the y axis direction. Thus, even if a change in the y axis direction occurs in an operation of moving the test terminal 111b, the distance $D_1$ in the x coordinate direction which does not have an effect on the setting is employed, thereby contributing to improvement of operability.

As shown in FIG. 26A, even if the test terminal 111b and a plurality of mobile network simulators 103b, 104b exist, the distance $D_1$ in the x coordinate direction is employed, for example, in the case where there is no need for a change in distance due to the movement in the y axis direction.

The distance $D_1$ in the x coordinate direction shown in FIG. 29A is obtained by the following formula.

$$D_1 = |Xb_1 - Xu_1|$$

In this manner, the transmission power $P_{D1}$ of a signal transmitted from the mobile network simulator 103c to the test terminal 111a is obtained by the following formula:

$$P_{D1} = F(G(D_1))$$

where G( ) is a function for obtaining an actual distance from a distance on the xy coordinate. With respect to this function G( ), an actual distance can be obtained by a linear function, an exponential function, a logarithm function or the like in accordance with a test object, the performance of the test terminal 111a or the like. The thus obtained actual distance is displayed on the distance display section 140 of the display device 106.

In this case, when any of the function is used, the personnel who executes testing select what actual distance is expressed by the movement of the test terminal 111b on the display screen from the test object, operability and the like, and the selected item is set in advance at the distance computing section 134.

In addition, F( ) is a predetermined function for computing transmission power (output level) from an actual distance. This function F( ) is a function for increasing transmission power (output level) as the distance is shorter.

The distance $C_1$ in the y coordinate direction and the distance $D_1$ in the x coordinate direction shown in FIG. 29B are obtained by the following formulas.

$$C_1 = |Y_{b1} - Y_{u1}|$$

$$D_1 = |X_{b1} - X_{u1}|$$

In this case, the transmission power $P_{A1}$ of the signal transmitted from the mobile network simulator 103c to the test terminal 111a is obtained by the formula:

$$P_{A1} = F(G(C_1 + D_1))$$

by using the added distance $(C_1 + D_1)$.

With respect to the function G( ) for obtaining an actual distance from a distance on the xy coordinate, a function Gx( ) for obtaining an actual distance in the x axis direction and a function Gy( ) for obtaining an actual distance in the y axis direction can be individually set.

In this case, after the actual distance $Gy(C_1)$ in the y direction and the actual distance $Gx(D_1)$ in the x direction have been obtained from the distance $C_1$ in the y direction and $D_1$ in the x direction, the transmission power $P_{A1}$ of the signal transmitted from the above-described mobile network simulator 103c to the test terminal 111a is obtained by the following formula.

$$P_{A1} = F(Gy(C_1) + Gx(D_1))$$

In accordance with this process, operability can be improved even in the case where the movable range on the display screen is small in one coordinate axis direction.

Figure 30:
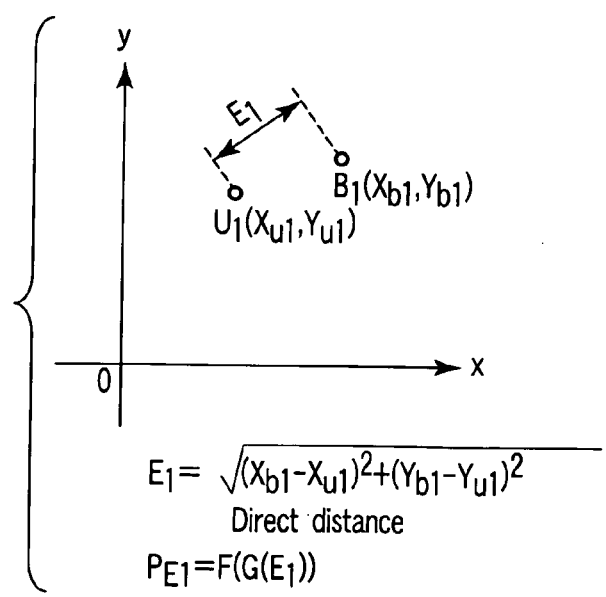
FIG. 30 is a view showing procedures for computing a distance and transmission power between the mobile network simulator section and the test terminal in the mobile network simulator apparatus shown in FIG. 23.

The direct distance $E_1$ shown in FIG. 30 is obtained by the formula $$E_1 = [(X_{b1} - X_{u1})^2 + (Y_{b1} - Y_{u1})^2]^{1/2}.$$

In this case, the transmission power $P_{E1}$ of the signal transmitted from the mobile network simulator 103c to the test terminal 111a is obtained by the formula:

$$P_{E1} = F(G(E_1)).$$

The transmission powers $P_{D1}$, $P_{A1}$, $P_{E1}$ obtained in FIGS. 29A, 29B and 30 are, for example, transmission powers in a condition in which there exist only one test terminal 111a and one mobile network simulator 103c, as shown in FIG. 26B.

Figure 31:
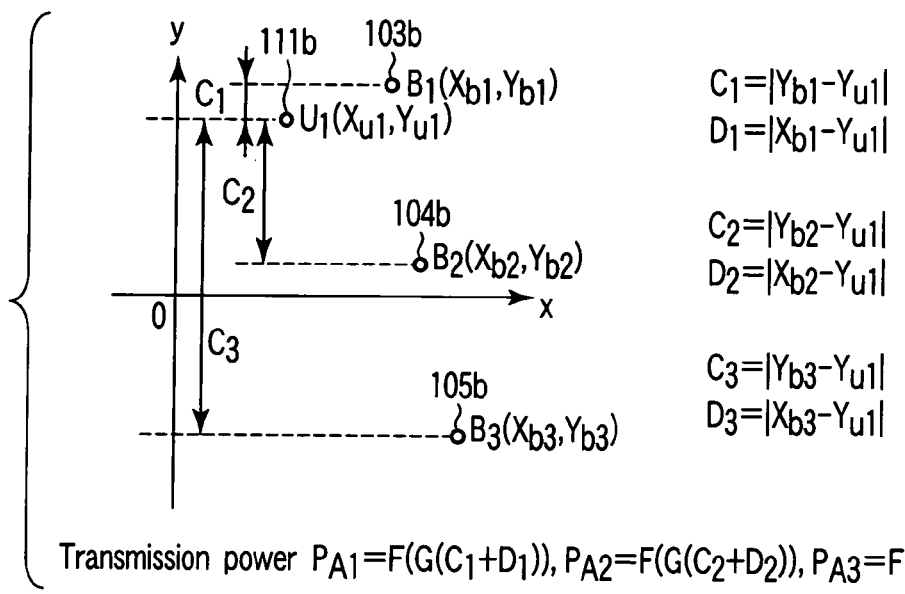
FIG. 31 is a view showing procedures for computing a distance and transmission power between the mobile network simulator section and the test terminal in the mobile network simulator apparatus shown in FIG. 23.
Figure 32:
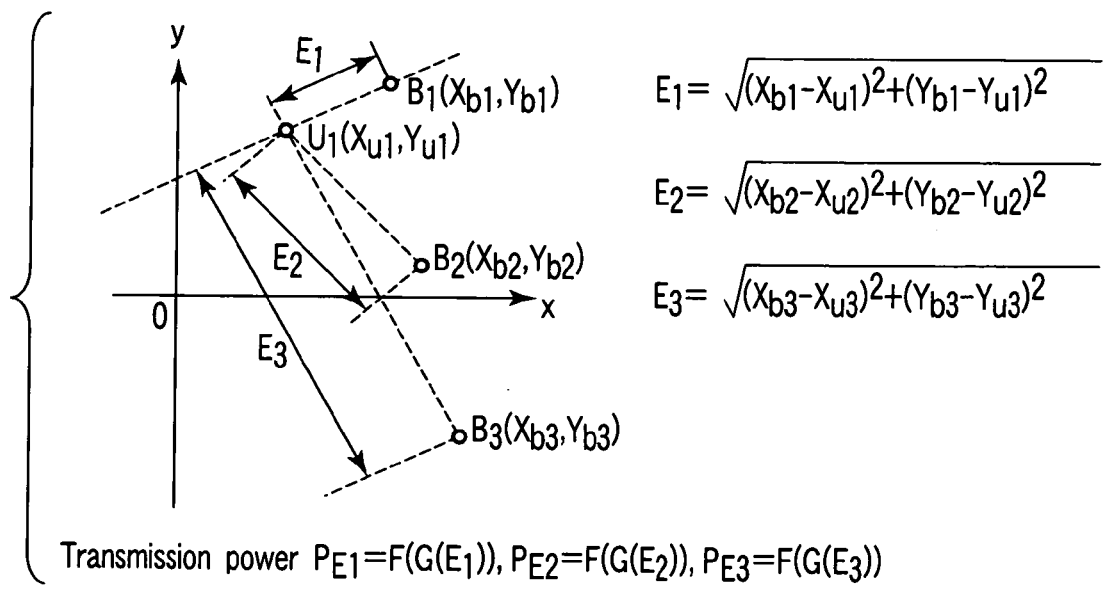
FIG. 32 is a view showing procedures for computing a distance and transmission power between the mobile network simulator section and the test terminal in the mobile network simulator apparatus shown in FIG. 23.

FIGS. 31 and 32, as shown in FIG. 28A, are views showing procedures for obtaining each of the transmission powers (output levels) of the mobile network simulators 103c, 104c, 105c relevant to the test terminal 111a in a condition in which there exist one test terminal 111a and three mobile network simulators 103c (103b), 104c (104b), 105c (105b) allocated to be distributed in the y coordinate direction and in a condition in which the pseudo areas 108, 109, 110 do not exist.

In FIG. 31, the distances $C_1$, $C_2$, $C_3$ in the y coordinate direction between each of the mobile network simulators 103b, 104b, 105b and the test terminal 111b are obtained, and further, the distances $D_1$, $D_2$, $D_3$ in the x coordinate direction between each of the mobile network simulators 103b, 104b, 105b and the test terminal 111b are obtained.

Then, the distances $(C_1 + D_1)$, $(C_2 + D_2)$, $(C_3 + D_3)$ each are obtained by adding the distances in the x and y coordinate directions between each of the mobile network simulators 103b, 104b, 105b and the test terminal 111b.

From each of the added distances $(C_1 + D_1)$, $(C_2 + D_2)$, $(C_3 + D_3)$, each of the transmission powers $P_{A1}$, $P_{A2}$, $P_{A3}$ of the mobile network simulators 103c, 104c, 105c relevant to the test terminal 111a is obtained by the following formula.

$$P_{A1} = F(G(C_1 + D_1))$$

$$P_{A2} = F(G(C_2 + D_2))$$

$$P_{A3} = F(G(C_3 + D_3))$$

In FIG. 32, on the other hand, the distances between each of the mobile network simulators 103b, 104b, 105b and the test terminal 111b are obtained as direct distances $E_1$, $E_2$, $E_3$, respectively. From the direct distances $E_1$, $E_2$, $E_3$, the transmission powers $P_{E1}$, $P_{E2}$, $P_{E3}$ of the mobile network simulators 103c, 104c, 105c relevant to the test terminal 111a are obtained by the following formula.

$$P_{E1} = F(G(E_1))$$

$$P_{E2} = F(G(E_2))$$

$$P_{E3} = F(G(E_3))$$

Figure 33A:
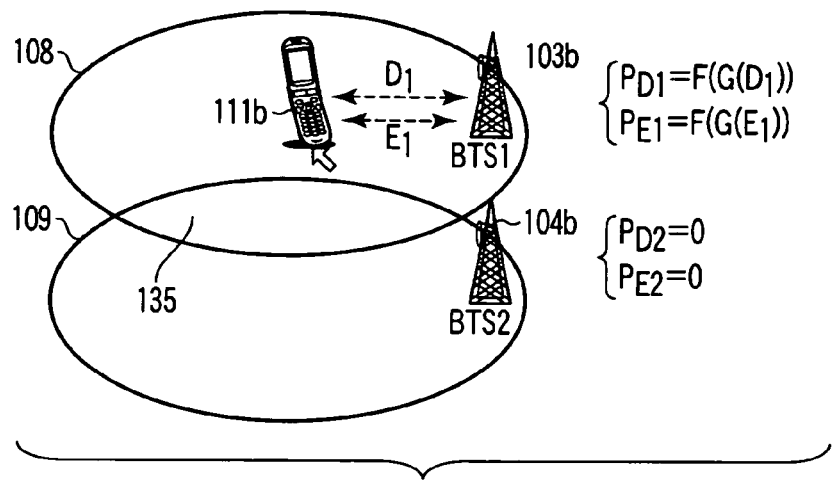
FIGS. 33A to 33C are views each showing procedures for computing a distance and transmission power between the mobile network simulator section and the test terminal in the mobile network simulator apparatus shown in FIG. 23.
Figure 33B:
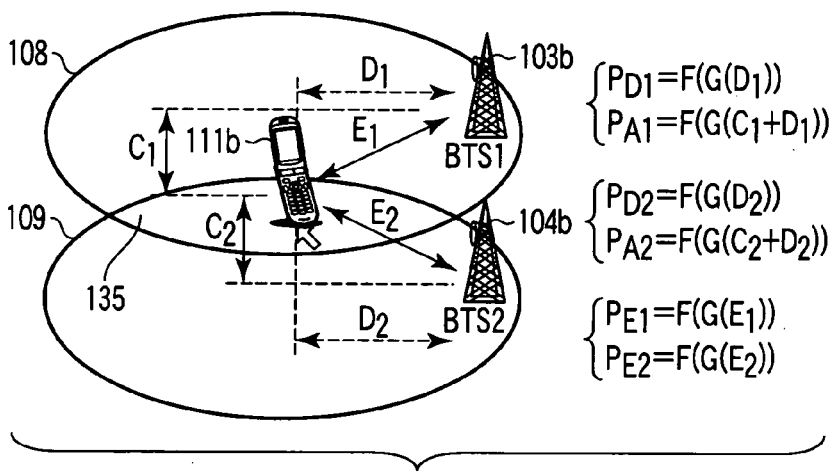
Figure 33C:
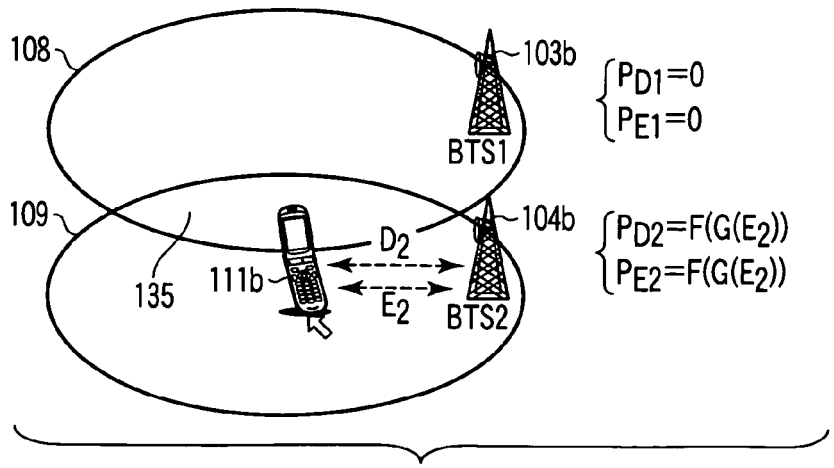

FIGS. 33A, 33B and 33C, as shown in FIG. 26A, are views showing procedures for each of the transmission powers (output levels) of each of the mobile network simulators 103c, 104c relevant to the test terminal 111a in the case where the test terminal 111b displayed on the display device 106 is moved in the y coordinate direction by means of the test terminal movement input section 130 and the test terminal movement control section 131 in a condition in which there exist one test terminal 111a (111b) and two mobile network simulators 103c (103b), 104c (104b) allocated to be distributed in the y coordinate direction and in a condition in which there exists a portion 135 at which the pseudo areas 108, 109 are superimposed on each other.

FIG. 33A shows a state in which the test terminal 111b is positioned at a portion other than the portion 135 which is superimposed in the pseudo area 108 of the mobile network simulator 103b.

In this state, the transmission power of the mobile network simulator 103b relevant to the test terminal 111a is obtained as two types of transmission powers, i.e., transmission power $P_{D1} = (F(G(D_1))$ obtained from the distance $D_1$ in the x coordinate direction between the mobile network simulator 103b and the test terminal 111a and transmission power $P_{E1} = (F(G(E_1))$ obtained from the direct distance $E_1$.

The test terminal 111b does not exist in the pseudo area 109 of the mobile network simulator 104b, and thus, two types of transmission powers $P_{D2}$, $P_{E2}$ of the mobile network simulator 104c relevant to the test terminal 111a are both "0" (output stop state).

In this way, the personnel who executes testing merely makes an operation of changing a distance between the test terminal and the mobile network simulator, thereby making it possible to automatically change the transmission power (output level) of the mobile network simulator relevant to the test terminal. Thus, the personnel who executes testing can remarkably improve the test work efficiency relevant to the test terminal.

FIG. 33B shows a state in which the test terminal 111b is positioned in the portion 135 at which the pseudo areas 108, 109 are superimposed on each other.

In this state, the transmission power of the mobile network simulator 103c relevant to the test terminal 111a is obtained as three types of transmission powers, i.e., transmission power $P_{D1}=(F(G(D_1))$ obtained from the distance D1 in the x coordinate direction between the mobile network simulator 103*b* and the test terminal 111*a*; transmission power $P_{A1}=F(G(C_1+D_1))$ obtained from the distance $(C_1+D_1)$ obtained by adding the distance $C_1$ in the y coordinate direction and the distance $D_1$ in the x coordinate direction between the mobile network simulator 103*b* and the test terminal 111*b* and; and the transmission power $P_{E1}=F(G(E_1))$ obtained from the direct distance $E_1$.

Similarly, the transmission power of the mobile network simulator 104*c* relevant to the test terminal 111*a* is obtained as three types of transmission powers, i.e., transmission power $P_{D2}=(F(G(D_2))$ obtained from the distance $D_2$ in the x coordinate direction between the mobile network simulator 104*b* and the test terminal 111*a*; transmission power $P_{A2}=F(G(C_2+D_2))$ obtained from the distance $(C_2+D_2)$ obtained by adding the distance $C_2$ in the y coordinate direction and the distance $D_2$ in the x coordinate direction between the mobile network simulator 104*b* and the test terminal 111*b*; and the transmission power $P_{E1}=F(G(E_2))$ obtained from the direct distance $E_1$.

In a state in which the test terminal 111*b* is thus positioned in the portion 135 at which the pseudo areas 108, 109 are superimposed on each other, the distance on the display screen used for computing the transmission power of each of the mobile network simulators 103*c*, 104*c* relevant to the test terminal 111*a* can be selected from among the distance $D_1$ in the x coordinate direction; the distance $(C_1+D_1)$ obtained by adding the distance $C_1$ in the y coordinate direction and the distance $D_1$ in the x coordinate direction; and the direct distance $E_1$.

Therefore, the personnel who executes testing may selects an optimal "distance" from among these three types of distances in accordance with a condition in which each of the mobile network simulators 103*c* (103*b*), 104*c* (104*b*), 105*c* (105*b*) is allocated on a two-dimensional region.

For example, the transmission powers $P_{A1}$, $P_{A2}$ are respectively obtained by the added distances $(C_1+D_1)$, $(D_2+D_2)$ in a condition in which the mobile network simulators 103*b*, 104*b* are allocated to be distributed only in the y axis direction.

In this case, in a state in which the test terminal 111*b* moves in parallel to the y axis in the superimposed portion 135, the test terminal 111*b* maintains a constant value in a total signal level of signals received from the mobile network simulators 103*b*, 104*b*.

FIG. 33C shows a state in which the test terminal 111*b* is positioned at a portion other thane the portion 135 superimposed in the pseudo area 109 of the mobile network simulator 104*b*.

In this state, the transmission power of the mobile network simulator 104*c* relevant to the test terminal 111*a* is obtained as two types of transmission powers, i.e., the transmission power $P_{D2}=F(G(D_2))$ obtained from the distance $D_1$ in the x coordinate direction between the mobile network simulator 104*b* and the test terminal 111*b* and the transmission power $P_{E2}=F(G(E_2))$ obtained from the direct distance $E_2$.

The test terminal 111*b* does not exist in the pseudo area 108 of the mobile network simulator 103*b*, and thus, both of two types of the transmission powers $P_{D1}$, $P_{E1}$ of the mobile network simulator 103*c* relevant to the test terminal 111*a* is "0" (output stop state), as is the case with FIG. 33A.

While FIGS. 33A and 33C describe that the test terminal 111*b* does not include processing for adding the distances $C_1$, $C_2$ in the y axis direction to the direction $D_1$, $D_2$ in the x axis direction when the test terminal 111*b* is positioned in only each of the pseudo areas 108, 109, the transmission powers may be obtained by the added distances $(C_1+D_1)$, $(C_2+D_2)$ in the pseudo areas 108, 109.

It is assumed that the personnel who executes testing sets in advance which of the three types of transmission powers described previously is employed at the distance computing section 134 and the transmission power computing section 129.

In this way, in the case where the test terminal 111*b* crosses a plurality of pseudo areas 108, 109 in which the mutually superimposed portion 135 exists, the transmission power of each of the mobile network simulators 103*c*, 104*c* relevant to the test terminal 111*a* is set at each position of the test terminal 111*b*. Thus, the personnel who executes testing can execute testing such as a handover test relevant to the test terminal 111*a* in a more realistic condition.

Figure 34:
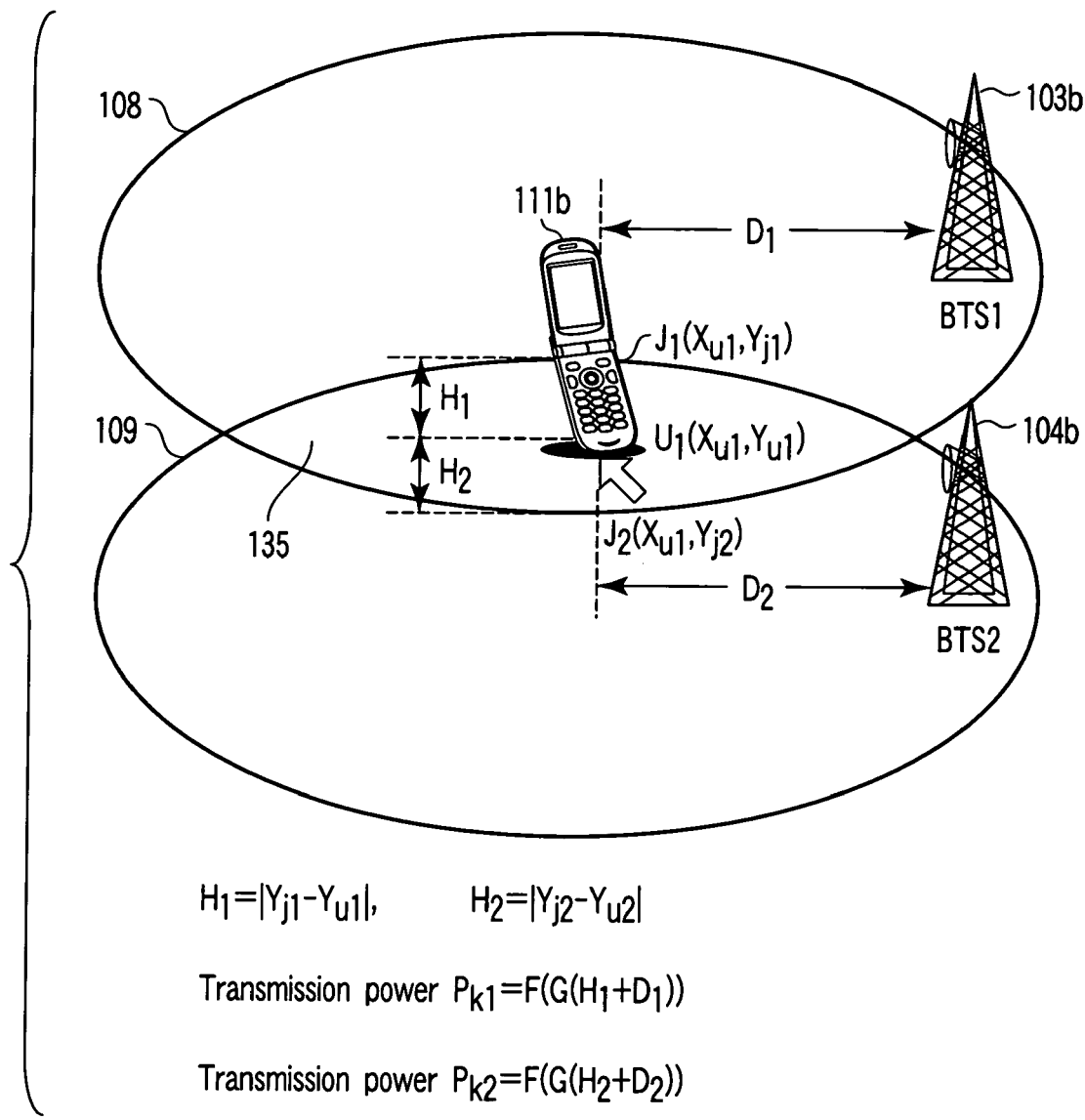
FIG. 34 is a view showing procedures for computing a distance and transmission power between the mobile network simulator section and the test terminal in the mobile network simulator apparatus shown in FIG. 23.

FIG. 34 is a view showing a method for computing fourth transmission powers $P_{K1}$, $P_{K1}$ of the mobile network simulators 103*c*, 104*c* relevant to the test terminal 111*a* in a state in which the test terminal 111*b* shown in FIG. 33B described previously is positioned in the portion 135 at which the pseudo areas 108, 109 are superimposed on each other.

Distances $H_1$, $H_2$ in the y axis direction on the boundary of the portion 135 at which the pseudo areas 108, 109 are superimposed on each other from positions (cross point) $J_1$ (coordinate $(X_{u1}, Y_{j1})$), $J_2$ $(X_{u1}, Y_{j2})$), each of which corresponds to X coordinate $X_{u1}$ of the test terminal 111*b* (coordinate $U_1$ $(X_{u1}, Y_{u1})$) to the test terminal 111*b* can be obtained by the following formulas.

$$H_1=|Y_{ji}-Y_{u1}|$$

$$H_2=|Y_{j2}-Y_{u1}|$$

Further, each of the distances $D_1$, $D_2$ in the x coordinate direction between each of the mobile network simulators 103*b*, 104*b* and the test terminal 111*b* on the display screen described previously is obtained.

From a distance $(H_1+D_1)$ obtained by adding the distance $H_1$ in the y coordinate direction from the boundary on the side of the pseudo area 108 of the superimposed portion 135 to the test terminal 111*b* and the distance $D_1$ in the x coordinate direction between the mobile network simulator 103*b* and the test terminal 111*b*, the fourth transmission power $P_{K1}$ of the mobile network simulator 103*c* relevant to the test terminal 111*a* is obtained by the formula below.

$$P_{K1}=F(G(H_1+D_1))$$

Similarly, from a distance $(H_2+D_2)$ obtained by adding the distance $H_2$ in the y coordinate direction from the boundary on the side of the pseudo area 109 of the superimposed portion 135 to the test terminal 111*b* and the distance $D_2$ in the x coordinate direction between the mobile network simulator 104*b* and the test terminal 111*b*, the fourth transmission power $P_{K2}$ of the mobile network simulator 104*c* relevant to the test terminal 111*a* is obtained by the formula below.

$$P_{K2}=F(G(H_2+D_2))$$

In this manner, it is possible to employ the fourth transmission powers $P_{K1}$, $P_{K2}$ of the mobile network simulators 103*c*, 104*c* relevant to the test terminal 111*a* in a state in which the test terminal 111*b* is positioned in the portion 135 at which the pseudo areas 108, 109 are superimposed on each other.

The present invention is not limited to the above-described embodiments. In a mobile network simulator apparatus 143 according to the fourth embodiment, testing of one test terminal 111*a* has been carried out. However, it is possible to connect another test terminal to the mobile network simulator apparatus 143, display these two test terminals on the display device 106, and carry out a comparative test between the two test terminals via a mobile network simulator.

It is also possible to form each of the pseudo areas 108, 109, 110 in a circular shape, and further, to carry out a test of the test terminal 111*a* by allocating a mobile network simulator (not shown) such that the pseudo areas of three or more mobile network simulators are superimposed on each other.

Therefore, according to the present invention, there can be provided a mobile simulator apparatus capable of remarkably improving workability of the personnel who executes testing or the like as described in detail in the above first to fourth embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile network simulator apparatus comprising:
a mobile network simulator section interposed between a test terminal to be tested and at least one connection destination configured to be connected to the test terminal, the mobile network simulator section having a function as at least one mobile network simulator which forms a connection line between the test terminal and the connection destination in response to a connection request from any one of the test terminal and the connection destination to the other and which disconnects the communication line in response to a disconnection request from the any one or the other;
a sequence state display control section which, with respect to a series of communication tests between the test terminal and the connection destination connected via the communication line formed by the mobile network simulator section, displays on a sequence display section of a display device at least one of sequences indicating communication procedures and communication transition states between the test terminal and the mobile network simulator section and between the connection destination and the mobile network simulator section; and
a connection state display control section which associates the connection state between the test terminal and the connection destination via the mobile network simulator section with the communication transition state to be linked with a sequence display by the sequence state display control section and to be displayed on a connection state display section of the display device.

2. A mobile network simulator apparatus according to claim 1, wherein the at least one of the connection destinations displayed on the connection state display section of the display device by the connection state display control section is a virtual connection destination which simulates an actual connection destination.

3. A mobile network simulator apparatus according to claim 1, further comprising:
test terminal moving means including a graphical user interface which changes a distance on the display screen to the mobile network simulator section from the test terminal displayed on the connection state display section of the display device by the connection state display control section by moving the test terminal through an external operation; and
output level setting means for changing a level of a transmission signal from the mobile network simulator section to the test terminal according to the distance from the test terminal moved on the display screen to the mobile network simulator section.

4. A mobile network simulator apparatus according to claim 1, wherein, when the distance on the display screen is longer than a predetermined distance, the output level setting means decreases the level of the transmission signal relevant to the test terminal from the mobile network simulator depending on the distance, and, when the distance on the display screen is shorter than the predetermined distance, the output level setting means increases the level of the transmission signal from the mobile network simulator section depending on the distance.

5. A mobile network simulator apparatus according to claim 1, further comprising:
a mail application which, when at least one of the connectable connection destinations is an E-mail server, carries out transmission and reception of an E-mail to and from the E-mail server; and
editing means for displaying the E-mail transmitted and received by the mail application on a mail screen display section of the display device, and enabling editing by an external operation.

6. A mobile network simulator apparatus according to claim 1, wherein the at least one of the connectable connection destinations is another mobile network simulator apparatus.

7. A mobile network simulator apparatus according to claim 1, wherein, as the sequence displayed on the sequence display section of the display device by the sequence state display control section, at least one of the sequence indicating the communication procedure and communication transition state between the test terminal and the mobile network simulator section and the sequence indicating the communication procedure and communication transition state between the connection destination and the mobile network simulator section can be selected with respect to a communication test between the test terminal and the connection destination connected via the mobile network simulator section.

8. A mobile network simulator apparatus according to claim 3, wherein the test terminal and the network simulator section are displayed on a quadrature coordinate formed on the display screen in the connection state display section of the display device, and
the distance on the display screen is obtained in only a coordinate defined by one of the quadrature coordinates indicating positions of the test terminal and the mobile network simulator section on the quadrature coordinate.

9. A mobile network simulator apparatus according to claim 3, wherein, in the case where the position of the test terminal and the position of the mobile network simulator section are connected by a virtual straight line on the display screen in the connection state display section of the display device, the distance on the display screen is a distance indicated by the virtual straight line.

10. A mobile network simulator apparatus according to claim 9, further comprising a pseudo area display control section which, when the mobile network simulator section has a function as a plurality of mobile network simulators, displays on the display screen of the display device each of pseudo communication areas in the plurality of mobile network simulators, each of the pseudo communication areas indicating a communication range between the test terminal and each of the mobile network simulators, wherein the output level setting means changes each of output levels of transmission signals to the test terminal from each of the mobile network simulators in response to a change of a distance indicated by a length of virtual straight lines on the display screen between each of the mobile network simulators and the test terminal in a portion at which each of the pseudo communication areas are superimposed on each other.

11. A mobile network simulator apparatus according to claim 1, wherein the at least one of the connectable connection destinations includes at least one of an actual call destination, a server, and a TV telephone (Video call terminal).

12. A mobile network simulator apparatus according to claim 1, wherein the sequence state display control section displays, as the sequences indicating the communication procedures and communication transition states displayed on the sequence display section, a series of sequences composed of: a "Power OFF" sequence indicating a power OFF state of the test terminal; a "Release position registration" sequence indicating a release position registration state of the test terminal; a "Position registration" sequence indicating a position registration state of the test terminal; a "Standby state" sequence indicating a standby state of the test terminal; a "Call origination" sequence indicating a call origination state of the test terminal; a "Call termination" sequence indicating a call termination state of the test terminal; a "Communication state" sequence indicating a communication state of the test terminal; an "UE (user equipment: test terminal 8) disconnection" sequence indicating a disconnection state of the test terminal; and an "NW (network connection destination) disconnection" sequence indicating a disconnection state from the connection destination by changing a display state according to a transition state when a display is made in a flow chart manner together with an arrow indicating communication procedures and a communication state transition direction among the respective sequences.

13. A mobile network simulator apparatus according to claim 2, wherein, when the connection state display control section graphically displays the test terminal, the mobile network simulator section, and at least one of a virtual call destination, a virtual server, and a virtual TV telephone (Video call terminal) serving as the virtual connection destinations on the connection state display section, and graphically displays a plurality of connection lines among the test terminal and at least one of the virtual call destination, the virtual server and the virtual TV telephone (Video call terminal) graphically displayed on the connection state display section, relevant to the mobile network simulator section, the control section displays a display state for the plurality of the connection lines to be changed depending on the presence or absence of connection.

14. A mobile network simulator apparatus according to claim 1, further comprising a connection destination display section which graphically displays on the display screen a virtual connection destination to which the test terminal has been connected via the mobile network simulator section.

15. A mobile network simulator apparatus according to claim 14, wherein the connection destination display section displays a display section and an operating section of the virtual call destination graphically displayed on the display screen.

16. A mobile network simulator apparatus according to claim 1, wherein, when a code division multiple access system such as wideband code division multiple access (W-CDMA) is used as a communication system of the communication circuit, the mobile network simulator section comprises:

an RF input section which carries out RF input processing for a signal received from the test terminal via a receiver section;
a reception processing section which receives an output from the RF input section;
an input IF processing section which produces as a low frequency the output from the RF input section in the reception processing section;
an inverse diffusion section and a decoder section which sequentially carry out inverse diffusion and decode processing for the signal produced as the low frequency by the input IF processing section in the reception processing section;
a communication control section having incorporated therein a connection destination specifying section which executes a function of an exchanger including connection destination specifying based on at least data decoded by the decoder section to call the connection destination specified by the test terminal;
a transmission processing section which transmits data inputted from the connection destination via the communication control section;
an encoder section which encodes the inputted data in the transmission processing section;
a diffusion section and an output IF processing section which sequentially carry out diffusion processing and high frequency processing for data encoded by the encoder section in the transmission processing section; and
an RF output section which outputs as an RF output signal for a signal processed as the high frequency by the output IF processing section, and
the RF output signal output by the RF output section is transmitted to the test terminal via a transmitter section.

17. A mobile network simulator apparatus according to claim 16, further comprising a sequence state detecting section which detects a current sequence state in a communication test relevant to the test terminal from the communication control section of the mobile network simulator section, wherein the sequence state display control section display on the sequence display section the current sequence state in the communication test relevant to the test terminal based on the sequence state detected by the sequence state detecting section.

18. A mobile network simulator apparatus according to claim 16, further comprising a connection state detecting section which detects a current connection state in a communication test relevant to the test terminal from the communication control section of the mobile network simulator section, wherein the connection state display control section displays on the connection state display section the current connection state in the communication test relevant to the test terminal based on the connection state detected by the connection state detecting section.

* * * * *